US007187146B2

(12) United States Patent
Saito et al.

(10) Patent No.: US 7,187,146 B2
(45) Date of Patent: Mar. 6, 2007

(54) OPENING-AND-CLOSING CONTROL DEVICE

(75) Inventors: Sachihiro Saito, Kasugai (JP); Takeshi Yasuda, Nagoya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/375,275

(22) Filed: Mar. 14, 2006

(65) Prior Publication Data
US 2006/0214619 A1 Sep. 28, 2006

(30) Foreign Application Priority Data
Mar. 23, 2005 (JP) ............................ 2005-084626

(51) Int. Cl.
B60J 1/17 (2006.01)
E05F 15/16 (2006.01)

(52) U.S. Cl. .................. 318/285; 318/286; 318/446; 318/469; 49/29

(58) Field of Classification Search ........ 318/255–257, 318/268, 283–286, 445–446, 466–470, 484; 49/26, 28–31
See application file for complete search history.

(56) References Cited

U.S. PATENT DOCUMENTS

| 5,537,013 | A | * | 7/1996 | Toyozumi et al. | .......... 318/283 |
| 5,650,698 | A | * | 7/1997 | Ito et al. | ............... 318/282 |
| 6,081,085 | A | * | 6/2000 | Ohashi et al. | ............ 318/283 |
| 6,111,373 | A | * | 8/2000 | Ohashi | ............... 318/265 |
| 6,426,604 | B1 | * | 7/2002 | Ito et al. | ............... 318/466 |
| 6,581,332 | B1 | * | 6/2003 | Kim | ............... 49/358 |

FOREIGN PATENT DOCUMENTS

| EP | 0 898 039 | 2/1999 |
| JP | 5-89771 | 12/1993 |
| JP | 7-139260 | 5/1995 |
| JP | 8-77861 | 3/1996 |
| JP | 2554559 | 7/1997 |
| JP | 2001-118465 | 4/2001 |

OTHER PUBLICATIONS

Patent Abstract of Japan; Publication No. 07139260; Publication Date: May 30, 1995 (1 page).

* cited by examiner

*Primary Examiner*—Bentsu Ro
(74) *Attorney, Agent, or Firm*—Osha Liang LLP

(57) ABSTRACT

An opening-and-closing control device is disclosed, in which speed of an opening-and-closing body can be increased even while automatic operation is performed. The device includes an operation knob that performs opening-and-closing control of an opening-and-closing body according to an instruction from an operation switch which is switchable to each of positions of "automatic closing", "manual closing", "neutral", "manual opening" and "automatic opening", wherein first the operation knob is operated to start the automatic opening operation, and then when the operation knob is held in the position of the "automatic opening", an opening speed of the opening-and-closing body is increased according to a time period for which the operation knob is held in the position of the "automatic opening", therefore the opening-and-closing body can be opened at high speed even while the automatic opening operation is performed.

12 Claims, 24 Drawing Sheets

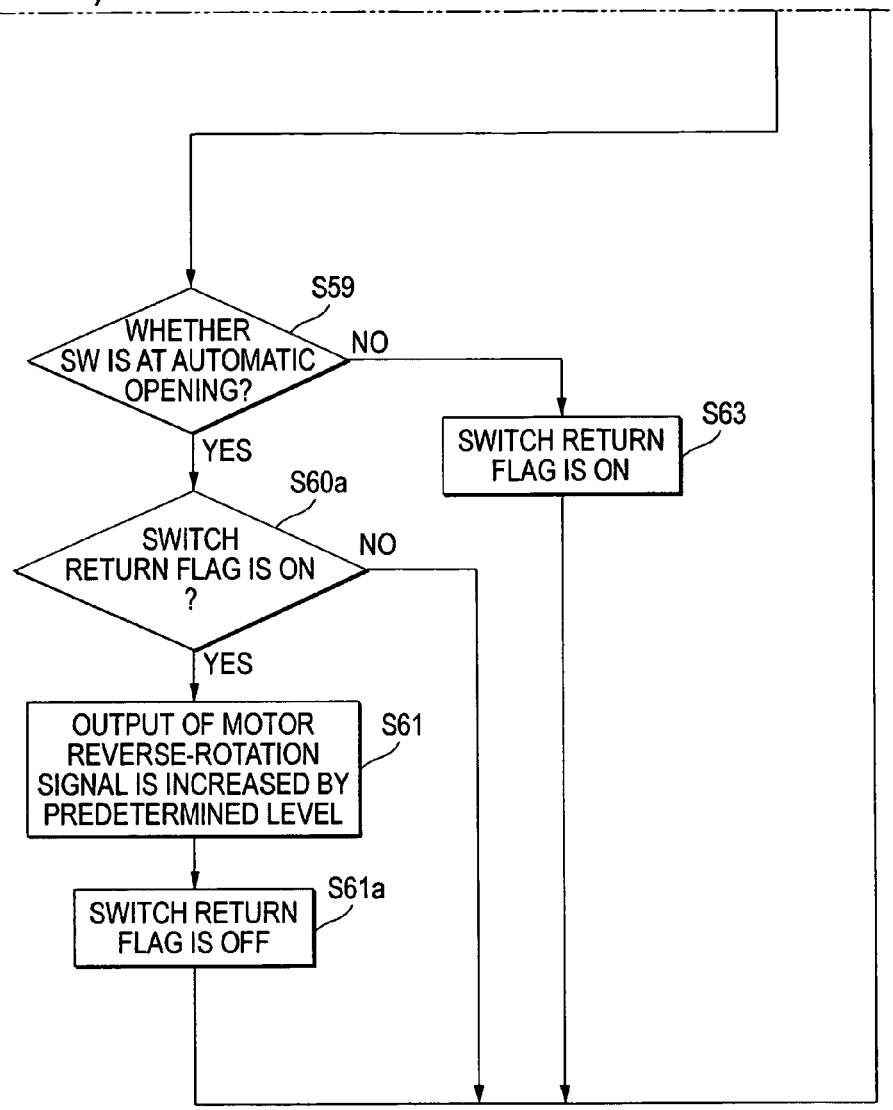

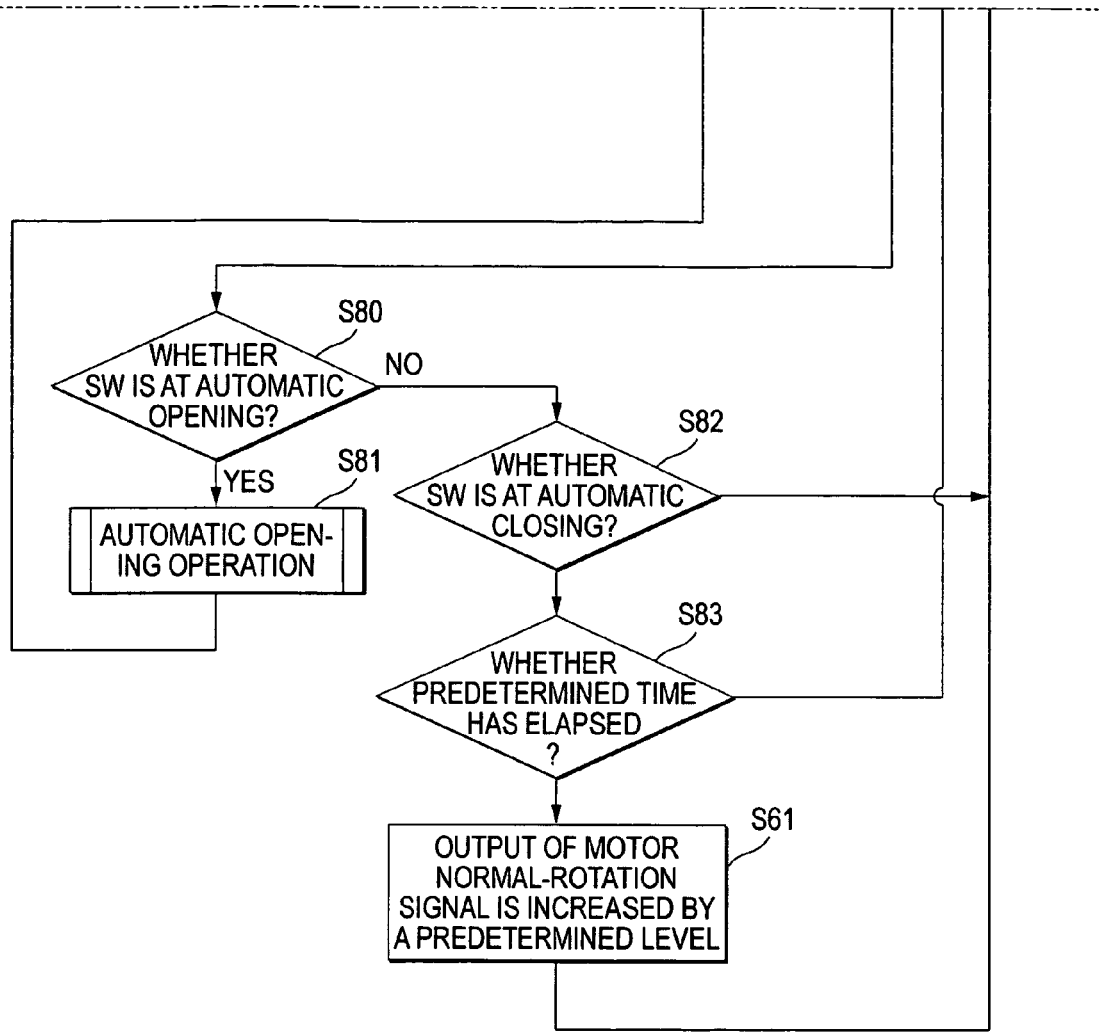

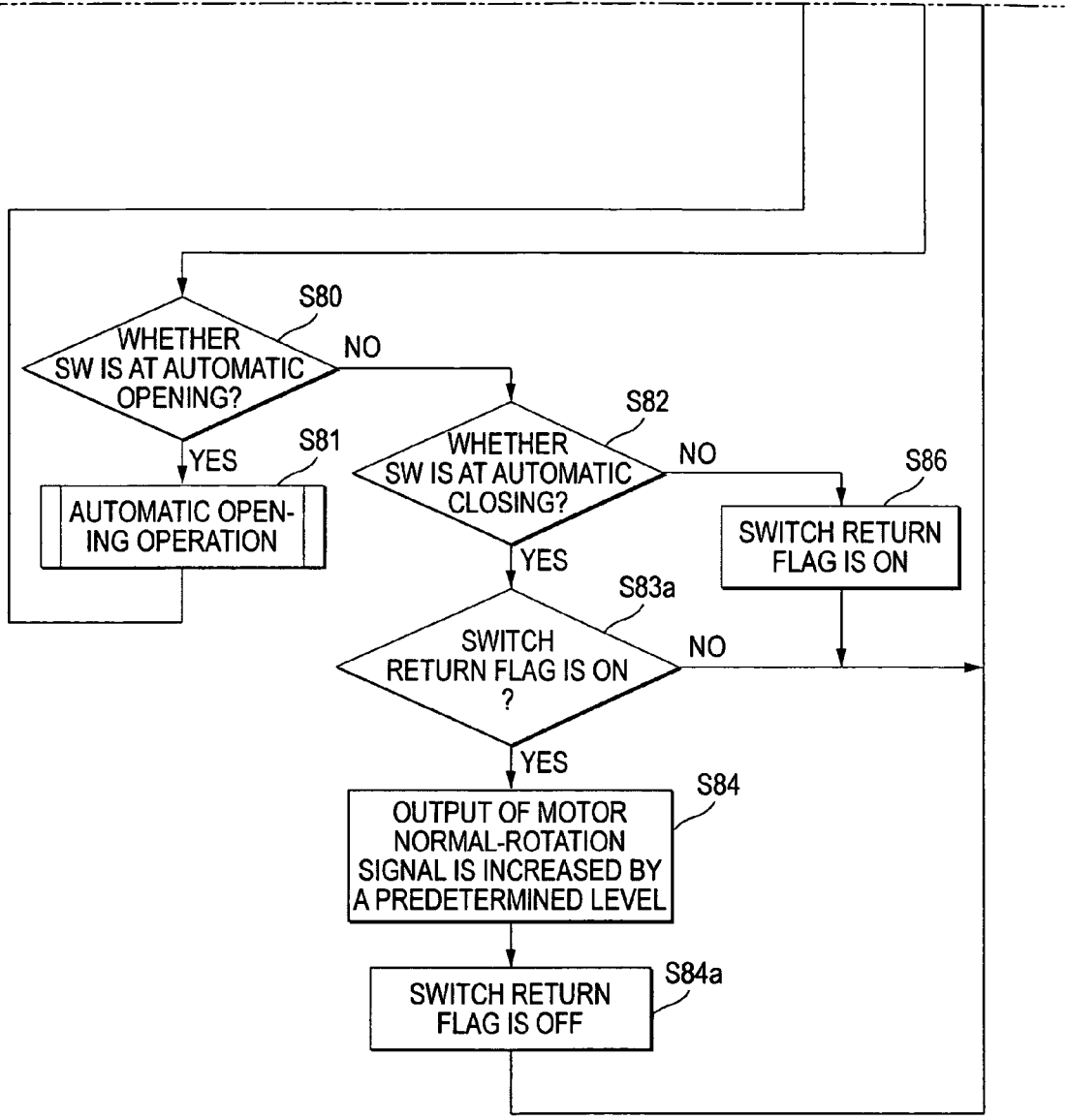

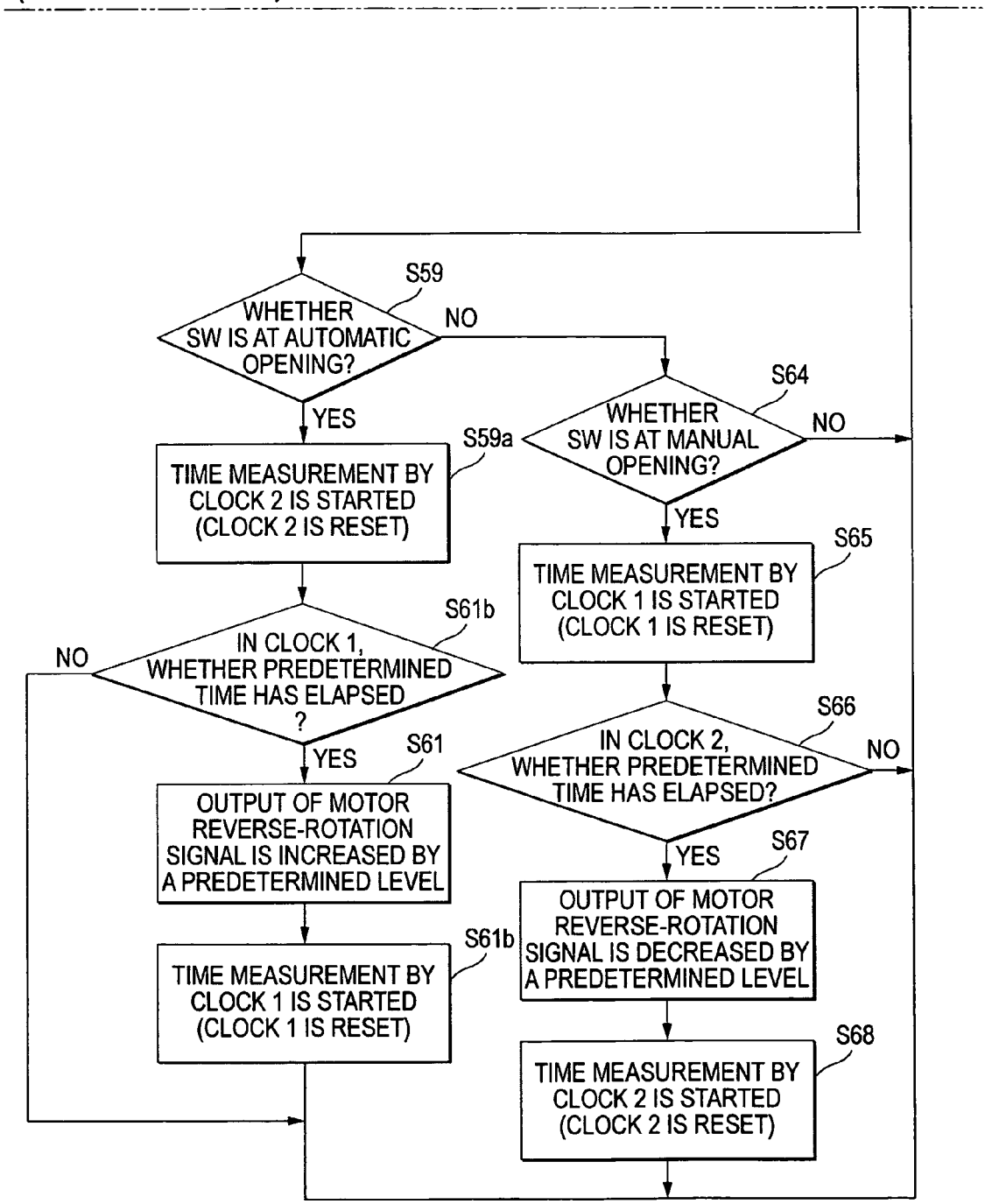
(FIG.12 CONTINUED)

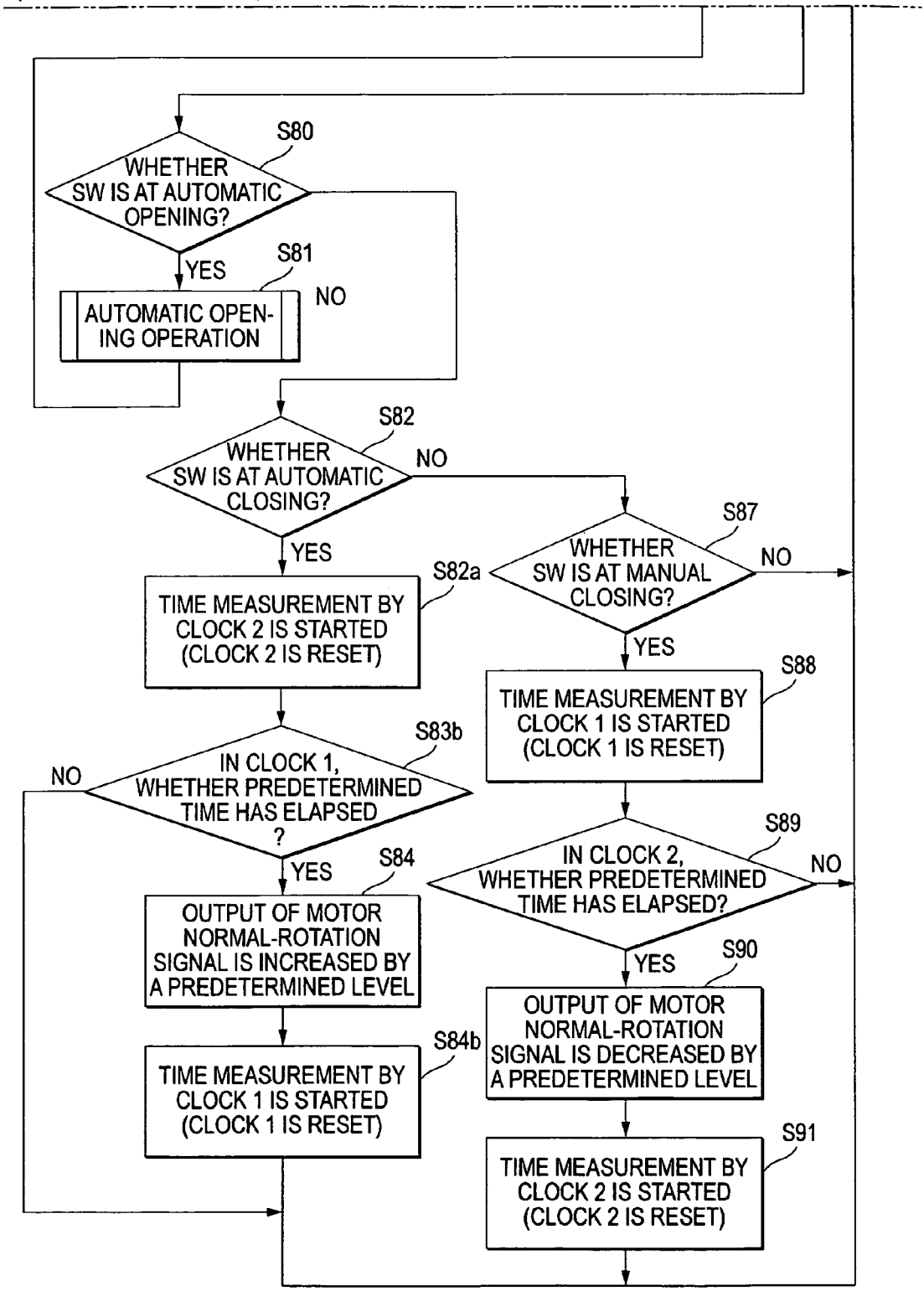
(FIG.13 CONTINUED)

US 7,187,146 B2

OPENING-AND-CLOSING CONTROL DEVICE

BACKGROUND OF THE INVENTION

1. Field of the Invention

The present invention relates to an opening-and-closing control device for controlling opening and closing of a window of a vehicle and the like.

2. Description of Related Art

An opening-and-closing control device of a window of a vehicle (hereinafter, called "power window device") is a device that moves up and down a windowpane by normally or reversely rotating a motor in response to switch operation in order to open and close a window. FIG. 1 is a block diagram showing an electrical configuration of a power window device. 1 is an operation switch for operating opening and closing of a window; 2 is a motor drive circuit for driving a motor 3; 4 is a rotary encoder for outputting pulses in synchronization with rotation of the motor 3; 5 is a pulse detection circuit for detecting the pulses outputted from the rotary encoder 4; 6 is a control section including CPU for controlling opening and closing operation of the window; 7 is a memory including ROM, RAM or the like; and 8 is a clock for measuring time. While the clock 8 is shown here for convenience of later reference of FIG. 1 as an embodiment of the invention, the clock 8 is not essential in a device in the related art.

When the operation switch 1 is operated, a window opening-and-closing instruction is provided to the control section 6, and then the motor 3 is normally or reversely rotated by the motor drive circuit 2. Rotation of the motor 3 actuates a window opening-and-closing mechanism interlocked with the motor 3 for opening and closing of the window. The pulse detection circuit 5 detects the pulses outputted from the rotary encoder 4, and the control section 6 calculates a level of opening-and-closing of the window and motor speed based on detection results to control rotation of the motor 3 via the motor drive circuit 2.

FIG. 2 is a schematic block diagram showing an example of the operation switch 1. The operation switch 1 includes an operation knob 11 that is rotatable in an a/b direction with a shaft Q as a center; a rod 12 provided integrally with the operation knob 11; and a known slide switch 13. 14 is an actuator for the slide switch 13; and 20 is a cover of a switch unit that incorporates the operation switch 1. A lower end of the rod 12 is engaged with the actuator 14 for the slide switch 13, and when the operation knob 11 is rotated in the a/b direction, the actuator 14 is moved in a c/d direction via the rod 12, and a contact (omitted to be shown) of the slide switch 13 is switched according to a moving position of the actuator.

The operation knob 11 is switchable to each of positions of automatic closing AC, manual closing MC, neutral N, manual opening MO, and automatic opening AO. FIG. 2 shows a condition where the operation knob 11 is situated in the position of the neutral N. When the operation knob 11 is rotated a certain amount in the a-direction from the position of the neutral to the position of the manual closing MC, manual closing operation where window is closed in manual operation is performed, and when the operation knob 11 is further rotated in the a-direction from the position of the manual closing to the position of the automatic closing AC, automatic closing operation where window is closed in automatic operation is performed. Moreover, when the operation knob 11 is rotated a certain amount in the b-direction from the position of the neutral N to the position of the manual opening MO, manual opening operation where window is opened in manual operation is performed, and when the operation knob 11 is further rotated in the b-direction from the position of the manual opening to the position of the automatic opening AO, automatic opening operation where window is opened in automatic operation is performed. The operation knob 11 is provided with a not-shown spring, and when a hand is released from the operation knob 11 that has been rotated, the operation knob 11 is returned to the position of the neutral N by force of the spring.

In the case of manual operation, operation of closing or opening the window is performed only while the operation knob 11 is held by the hand to the position of the manual closing MC or the manual opening MO, and once the hand is released from the operation knob 11 and the knob is returned to the position of the neutral N, the operation of closing or opening the window is stopped. On the other hand, in the case of automatic operation, once the operation knob 11 is rotated to the position of the automatic closing AC or the automatic opening AO, after that the operation of closing or opening the window is continued even if the hand is released from the operation knob 11 and the knob is returned to the position of the neutral N.

FIG. 3 is a view showing an example of a window opening-and-closing mechanism provided in each window of a vehicle. 100 is a window of a motor vehicle; 101 is a windowpane as an opening-and-closing body for opening and closing the window 100; and 102 is a window opening-and-closing mechanism. The windowpane 101 performs up-and-down moving operation by actuation of the window opening-and-closing mechanism 102, and the window 100 is closed by rising of the windowpane 101, and the window 100 is opened by lowering of the windowpane 101. In the window opening-and-closing mechanism 102; 103 is a support member attached to a lower end of the windowpane 101. 104 is a first arm that is engaged with the support member 103 at one end, and rotatably supported by a bracket 106 at the other end. 105 is a second arm that is engaged with the support member 103 at one end, and engaged with a guide member 107 at the other end. 3 is the motor, and 4 is the rotary encoder. The rotary encoder 4 is connected to a rotation shaft of the motor 3, and outputs a number of pulses proportional to the amount of rotation of the motor 3. By counting the number of pulses outputted from the rotary encoder 4 within a predetermined time period, rotation speed of the motor 3 can be detected. Moreover, a degree of opening of the window 100 can be calculated from output of the rotary encoder 4.

109 is a pinion rotationally driven by the motor 3, and 110 is a fan-like gear rotationally meshed with the pinion 109. The gear 110 is fixed to the first arm 104. The motor 3 is rotatable in normal and reverse directions, and rotates the pinion 109 and the gear 110 by the normal and reverse rotation to turn the first arm 104 in the normal and reverse directions. Following this, the other end of the second arm 105 slides in a lateral direction along a slot in the guide member 107, thereby the support member 103 is moved vertically to raise and lower the windowpane 101, so that the window 100 is opened and closed.

A power window device as above has a function of detecting pinching of an object when the operation knob 11 is situated in the position of the automatic closing AC in FIG. 2 to perform the automatic closing operation. That is, when an object Z is pinched in a space to the windowpane 101 during closing the window 100 as shown in FIG. 4, it is detected in order to stop the closing operation of the window 100, or switch the operation to opening operation. Since the window 100 is automatically closed during automatic closing operation, when a hand or a neck is pinched by mistake, the closing operation needs to be allowed to prevent a human body from danger. Thus, a pinching detection function as described above is provided. In detection of the pinching, the control section 6 reads rotation speed of the motor 3 as output of the pulse detection circuit 5 at any time, compares the current rotation speed to the previous rotation speed, and determines whether pinching occurs based on comparison results. When the pinching of the object Z occurs in the window 100, since load of the motor 3 is increased and thus rotation speed is decreased, variation in speed is increased. Thus, when the variation in speed exceeds a predetermined threshold value, it is determined that the pinching of the object Z has occurred. The threshold value is previously stored in the memory 7.

FIG. 15 is a flowchart showing basic operation of the power window device. When the operation switch 1 is situated in the position of the manual closing MC in step S101, the manual closing operation is performed (step S102); when the operation switch 1 is situated in the position of the automatic closing AC in step S103, the automatic closing operation is performed (step S104); when the operation switch 1 is situated in the position of the manual opening MO in step S105, the manual opening operation is performed (step S106); and when the operation switch 1 is situated in the position of the automatic opening AO in step S107, the automatic opening operation is performed (step S108). Moreover, when the operation switch 1 is not situated in the position of the automatic opening AO in step S107, the operation switch 1 is situated in the position of the neutral N and no operation is performed.

FIG. 16 is a flowchart showing a detailed procedure of the manual closing operation in the step S102 of FIG. 15. The procedure is executed by the CPU configuring the control section 6. First, whether the window 100 is fully closed in the manual closing operation is determined based on the output of the rotary encoder 4 (step S111). When the window 100 is fully closed (step S111: YES), the operation is finished, and when it is not fully closed (step S111: NO), a normal rotation signal is outputted from the motor drive circuit 2 to normally rotate the motor 3, so that the window 100 is closed (step S112). Subsequently, whether the window 100 is fully closed is determined (step S113), and when it is fully closed (step S113: YES), the operation is finished, and when it is not fully closed (step S113: NO), whether the operation switch 1 is situated in the position of the manual closing MC is determined (step S114). When the operation switch 1 is situated in the position of the manual closing MC (step S114: YES), the operation is returned to the step S112 to continue normal rotation of the motor 3, and when it is not situated in the position of the manual closing MC (step S114: NO), whether it is situated in the position of the automatic closing AC is determined (step S115). When the operation switch 1 is situated in the position of the automatic closing AC (step S115: YES), the operation is shifted to automatic closing operation described later (FIG. 17) (step S116), and when it is not situated in the position of the automatic closing AC (step S115: NO), whether it is situated in the position of the manual opening MO is determined (step S117). When the operation switch 1 is situated in the position of the manual opening MO (step S117: YES), the operation is shifted to manual opening operation described later (FIG. 18) (step S118), and when it is not situated in the position of the manual opening MO (step S117: NO), whether it is situated in the position of the automatic opening AO is determined (step S 119). When the operation switch 1 is situated in the position of the automatic opening AO (step S119: YES), the operation is shifted to automatic opening operation described later (FIG. 19) (step S120), and when the operation switch 1 is not situated in the position of the automatic opening AO (step S119: NO), the operation is finished without performing any operation.

FIG. 17 is a flowchart showing a detailed procedure of the automatic closing operation in the step S104 of FIG. 15. The procedure is executed by the CPU configuring the control section 6. First, whether the window 100 is fully closed in the automatic closing operation is determined based on the output of the rotary encoder 4 (step S121). When the window 100 is fully closed (step S121: YES), the operation is finished, and when it is not fully closed (step S121: NO), a normal rotation signal is outputted from the motor drive circuit 2 to normally rotate the motor 3, so that the window 100 is closed (step S122). Subsequently, whether the window 100 is fully closed is determined (step S123), and when it is fully closed (step S123: YES), the operation is finished, and when it is not fully closed (step S123: NO), whether pinching occurs is determined (step S124).

When the pinching of the object Z as shown in FIG. 4 occurs (step S124: YES), a reverse rotation signal is outputted from the motor drive circuit 2 to reversely rotate the motor 3, so that the window 100 is opened (step S125). Then, whether the window 100 is fully opened is determined (step S126), and when it is fully opened (step S126: YES), the operation is finished, and when it is not fully opened (step S126: NO), the operation is returned to the step S125 to continue reverse rotation of the motor 3. When the pinching is not detected in the step S124 (step S124: NO), whether the operation switch 1 is situated in the position of the manual opening MO is determined (step S127). When the operation switch 1 is situated in the position of the manual opening MO (step S127: YES), the operation is shifted to the manual opening operation described later (FIG. 18) (step S128), and when it is not situated in the position of the manual opening MO (step S127: NO), whether it is situated in the position of the automatic opening AO is determined (step S 129). When the operation switch 1 is situated in the position of the automatic opening AO (step S129: YES), the operation is shifted to the automatic opening operation described later (FIG. 19) (step S130), and when the operation switch 1 is not situated in the position of the automatic opening AO (step S129: NO), the operation is returned to the step S122 to continue the normal operation of the motor 3.

FIG. 18 is a flowchart showing a detailed procedure of the manual opening operation in the step S106 of FIG. 15. The procedure is executed by the CPU configuring the control section 6. First, whether the window 100 is fully opened in the manual opening operation is determined based on the output of the rotary encoder 4 (step S131). When the window 100 is fully opened (step S131:YES), the operation is finished, and when it is not fully opened (step S131: NO), the reverse rotation signal is outputted from the motor drive circuit 2 to reversely rotate the motor 3, so that the window 100 is opened (step S132). Subsequently, whether the window 100 is fully opened is determined (step S133), and when it is fully opened (step S133: YES), the operation is finished, and when it is not fully opened (step S133: NO), whether the operation switch 1 is situated in the position of the manual opening MO is determined (step S134). When the operation switch 1 is situated in the position of the manual opening MO (step S134: YES), the operation is returned to the step S132 to continue the reverse rotation of the motor 3, and when it is not situated in the position of the manual opening MO (step S134: NO), whether it is situated in the position of the automatic opening AO is determined (step S135). When the operation switch 1 is situated in the position of the automatic opening AO (step SI 35: YES), the operation is shifted to the automatic opening operation described later (FIG. 19) (step S136), and when it is not situated in the position of the automatic opening AO (step S135: NO), whether it is situated in the position of the manual closing MC is determined (step S137). When the operation switch 1 is situated in the position of the manual closing MC (step S137: YES), the operation is shifted to the manual closing operation described before (FIG. 16) (step S138), and when it is not situated in the position of the manual closing MC (step S137: NO), whether it is situated in the position of the automatic closing AC is determined (step S139). When the operation switch 1 is situated in the position of the automatic closing AC (step S139: YES), the operation is shifted to the automatic closing operation described before (FIG. 17) (step S140), and when it is not situated in the position of the automatic closing AC (step S139: NO), the operation is finished without performing any operation.

FIG. 19 is a flowchart showing a detailed procedure of the automatic opening operation in the step S108 of FIG. 15. The procedure is executed by the CPU configuring the control section 6. First, whether the window 100 is fully opened in the automatic opening operation is determined based on the output of the rotary encoder 4 (step S141). When the window 100 is fully opened (step S141: YES), the operation is finished, and when it is not fully opened (step S141: NO), the reverse rotation signal is outputted from the motor drive circuit 2 to reversely rotate the motor 3, so that the window 100 is opened (step S142). Subsequently, whether the window 100 is fully opened is determined (step S143), and when it is fully opened (step S143: YES), the operation is finished, and when it is not fully opened (step S143: NO), whether the operation switch 1 is situated in the manual closing MC is determined (step S144). When the operation switch 1 is situated in the position of the manual closing MC (step S144: YES), the operation is shifted to the manual closing operation described before (FIG. 16) (step S145), and when it is not situated in the position of the manual closing MC (step S144: NO), whether it is situated in the position of the automatic closing AC is determined (step S146). When the operation switch 1 is situated in the position of the automatic closing AC (step S147: YES), the operation is shifted to the automatic closing operation described before (FIG. 17) (step S146), and when the operation switch 1 is not situated in the position of the automatic closing AC (step S146: NO), the operation is returned to the step S142 to continue the reverse rotation of the motor 3.

The above power window device that performs each operation of the automatic closing, manual closing, automatic opening, or manual opening according to switching operation of a switch is described, for example, in patent literature 1 (JP-A-2001-118465) and patent literature 2 (JP-A-8-77861). Moreover, a technique for speed control of the opening-and-closing body is described in patent literatures 3 to 7 (JP-A-5-89771, Japanese Utility Model Registration No. 2,554,559, JP-A-9-60419, JP-A-2002-364251 and JP-A-2002-242533, respectively). The patent literature 3 describes a window regulator control device that can obtain a duty factor in accordance with on-duration of the operation switch, and finely adjust or quickly move the window based on the duty factor. The patent literature 4 describes a power window regulator that first drives the window at low speed for a certain time period, and then drives the window at high speed after the certain time period has passed. The patent literature 5 describes a power window device that determines a level of driving the windowpane from the amount of rotation of the knob, and drives the windowpane according to the determined drive level. The patent literature 6 describes a power window opening-and-closing device that opens and closes the window at an opening-and-closing speed in accordance with pressure applied to a pressure-sensitive switch. The patent literature 7 describes a drive unit of an electromotive slide door, in which when a door handle is operated during automatic opening-and-closing operation of the slide door, opening-and-closing speed of the slide door is increased prior to automatic opening-and-closing operation.

In the power window device having an automatic operation function, as described before, even if the operation knob 11 is operated to be situated in the position of the automatic closing AC or the automatic opening AO, and then the hand is released from the operation knob 11 so that the knob 11 is returned to the position of the neutral N, the closing or opening operation of the window is automatically performed. However, in the device in the related art, when the automatic operation is started and then the window is moved in a direction of opening or closing, a speed of the window is fixed, and the speed has not been able to be increased during automatic operation. While the patent literatures 3 to 7 show the operation of increasing the speed of the opening-and-closing body depending on an operation condition of the switch and the like, any of them shows operation of adjusting speed in manual operation, and is not intended to enable to increase the speed during automatic operation. Moreover, for example, in the device of the patent literature 3, since speed is continuously increased while the operation switch is on during manual operation, and when the hand is released from the operation switch, the opening-and-closing operation is stopped, therefore opening-and-closing speed can not be maintained at a desired speed.

SUMMARY OF THE INVENTION

Thus, in one aspect, the invention relates to an opening-and-closing control device that can increase the speed of the opening-and-closing body even while the automatic operation is performed. Moreover, in another aspect, the invention relates to an opening-and-closing control device that can decrease the speed of the opening-and-closing body even while the automatic operation is performed. Furthermore, still another aspect, the invention relates to an opening-and-closing control device that can keep an opening-and-closing speed that has been once increased or decreased.

A first opening-and-closing control device according to an embodiment of the invention comprises: an operation knob which performs opening-and-closing control of an opening-and-closing body according to an instruction from an operation switch that is switchable to each of positions of "automatic closing", "manual closing", "neutral", "manual opening" and "automatic opening"; manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic opening operation is started, opening speed of the opening-and-closing body is increased according to a time period for which the operation knob is held in the position of the "automatic opening" or the "manual opening".

In the first opening-and-closing control device, first the operation knob is operated to start the automatic opening operation, and then when the operation knob is held in the position of the "automatic opening" or the position of the "manual opening", the opening speed of the opening-and-closing body is increased according to holding time. Therefore, the speed can be increased even while the automatic opening operation is performed, thereby the opening-and-closing body can be quickly opened.

A second opening-and-closing control device according to an embodiment of the invention comprises: an operation knob which performs opening-and-closing control of an opening-and-closing body according to an instruction from an operation switch that is switchable to each of positions of "automatic closing", "manual closing", "neutral", "manual opening" and "automatic opening"; manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic opening operation is started, opening speed of the opening-and-closing body is increased according to the number of operation that the operation knob is temporarily returned to a position other than the position of the "automatic opening", and then situated in the position of the "automatic opening" or the "manual opening".

In the second opening-and-closing control device, first the operation knob is operated to start the automatic opening operation, and then when the operation knob is temporarily returned to a position other than the position of the "automatic opening", and then the operation knob is operated to be situated in the position of the "automatic opening" again, or situated in the position of the "manual opening", the opening speed of the opening-and-closing body is increased according to the number of operation. Therefore, the speed can be increased even while the automatic opening operation is performed, thereby the opening-and-closing body can be quickly opened.

A third opening-and-closing control device according to an embodiment of the invention comprises: an operation knob which performs opening-and-closing control of an opening-and-closing body according to an instruction from an operation switch that is switchable to each of positions of "automatic closing", "manual closing", 4"neutral", "manual opening" and "automatic opening", manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic closing operation is started, closing speed of the opening-and-closing body is increased according to a time period for which the operation knob is held in the position of the "automatic closing" or the position of the "manual closing".

In the third opening-and-closing control device, first the operation knob is operated to start the automatic closing operation, and then when the operation knob is held in the position of the "automatic closing" or the position of the "manual closing", the closing speed of the opening-and-closing body is increased according to holding time. Therefore, the speed can be increased even while the automatic closing operation is performed, thereby the opening-and-closing body can be quickly closed.

A fourth opening-and-closing control device according to an embodiment of the invention comprises: an operation knob which performs opening-and-closing control of an opening-and-closing body according to an instruction from an operation switch that is switchable to each of positions of "automatic closing", "manual closing", "neutral", "manual opening" and "automatic opening"; manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic closing operation is started, closing speed of the opening-and-closing body is increased according to the number of operation that the operation knob is temporarily returned to a position other than the position of the "automatic closing", and then situated in the position of the "automatic closing" or the position of the "manual closing".

In the fourth opening-and-closing control device, first the operation knob is operated to start the automatic closing operation, and then when the operation knob is temporarily returned to a position other than the position of the "automatic closing", and then the operation knob is operated to be situated in the position of the "automatic closing" again, or situated in the position of the "manual closing", the closing speed of the opening-and-closing body is increased according to the number of operation. Therefore, the speed can be increased even while the automatic closing operation is performed, thereby the opening-and-closing body can be quickly closed.

A fifth opening-and-closing control device according to an embodiment of the invention comprises: an operation knob which performs opening-and-closing control of an opening-and-closing body according to an instruction from an operation switch that is switchable to each of positions of "automatic closing", "manual closing", "neutral", "manual opening" and "automatic opening"; manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic opening operation is started, opening speed of the opening-and-closing body is increased according to a time period for which the operation knob is held in the position of the "automatic opening", and the opening speed of the opening-and-closing body is decreased according to a time period for which the operation knob is held in the position of the "manual opening".

In the fifth opening-and-closing control device, first the operation knob is operated to start the automatic opening operation, and then when the operation knob is held in the position of the "automatic opening", the opening speed of the opening-and-closing body is increased according to holding time, and when the operation knob is held in the position of the "manual opening", the opening speed of the opening-and-closing body is decreased according to holding time. Therefore, the speed can be increased or decreased even while the automatic opening operation is performed, thereby the opening-and-closing body can be quickly or slowly opened.

A sixth opening-and-closing control device according to an embodiment of the invention comprises: an operation knob which performs opening-and-closing control of an opening-and-closing body according to an instruction from an operation switch that is switchable to each of positions of "automatic closing", "manual closing", "neutral", "manual opening" and "automatic opening"; manual opening operation control means by which the operation knob is operated to be situated in the position of the "manual opening", thereby the opening-and-closing body is allowed to perform opening operation only while the operation knob is held in the position of that "manual opening"; manual closing operation control means by which the operation knob is operated to be situated in the position of the "manual closing", thereby the opening-and-closing body is allowed to perform closing operation only while the operation knob is held in the position of that "manual closing"; automatic opening operation control means by which the operation knob is operated to be situated in the position of the "automatic opening", thereby the opening-and-closing body is allowed to continuously perform the opening operation; and automatic closing operation control means by which the operation knob is operated to be situated in the position of the "automatic closing", thereby the opening-and-closing body is allowed to continuously perform the closing operation; wherein after the automatic closing operation is started, closing speed of the opening-and-closing body is increased according to a time period for which the operation knob is held in the position of the "automatic closing", and the closing speed of the opening-and-closing body is decreased according to a time period for which the operation knob is held in the position of the "manual closing".

In the sixth opening-and-closing control device, first the operation knob is operated to start the automatic closing operation, and then when the operation knob is held in the position of the "automatic closing", the closing speed of the opening-and-closing body is increased according to holding time, and when the operation knob is held in the position of the "manual closing", the closing speed of the opening-and-closing body is decreased according to holding time. Therefore, the speed can be increased or decreased even while the automatic closing operation is performed, thereby the opening-and-closing body can be quickly or slowly closed.

Moreover, it is also acceptable in one or more embodiments of the invention that, in the first, second, or fifth opening-and-closing control device, when the operation knob situated in the position of the "automatic opening" or "manual opening" is separated from that position, the opening-and-closing body is opened at a speed immediately before separation. According to this, when a hand is released from the operation knob, the opening-and-closing body continues the automatic opening operation at a speed immediately before releasing, consequently a speed that has been once increased or decreased is maintained, therefore the opening speed of the opening-and-closing body can be easily adjusted according to timing at which the hand is released.

Moreover, it is also acceptable in one or more embodiments of the invention that, in the third, fourth, or sixth opening-and-closing control device, when the operation knob situated in the position of the "automatic closing" or "manual closing" is separated from that position, the opening-and-closing body is closed at a speed immediately before separation. According to this, when a hand is released from the operation knob, the opening-and-closing body continues the automatic closing operation at a speed immediately before releasing, consequently a speed that has been once increased or decreased is maintained, therefore the closing speed of the opening-and-closing body can be easily adjusted according to the timing at which the hand is released.

According to an embodiment of the invention, the speed of the opening-and-closing body can be increased or decreased even while the automatic operation is performed, in addition, the opening or closing speed that has been once increased or decreased can be maintained.

DESCRIPTION OF PREFERRED EMBODIMENTS

Figure 1:
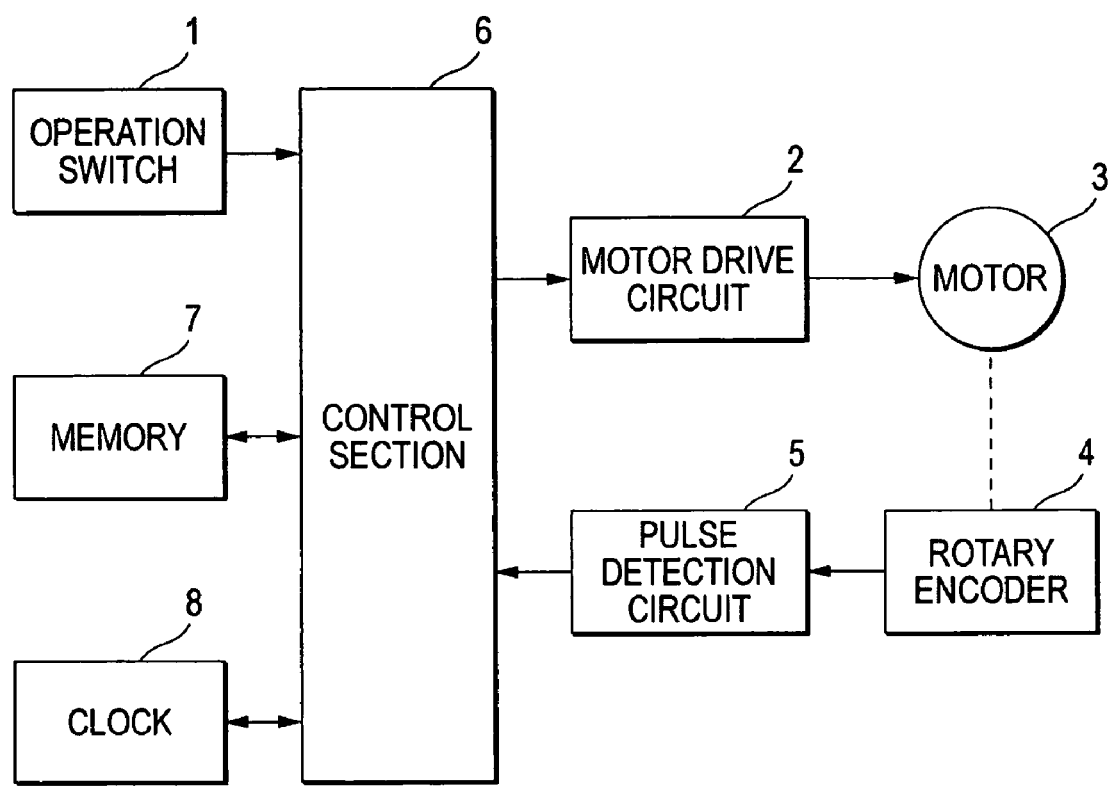
FIG. 1 is a block diagram showing an electrical configuration of a power window device of an embodiment of the invention.
Figure 2:
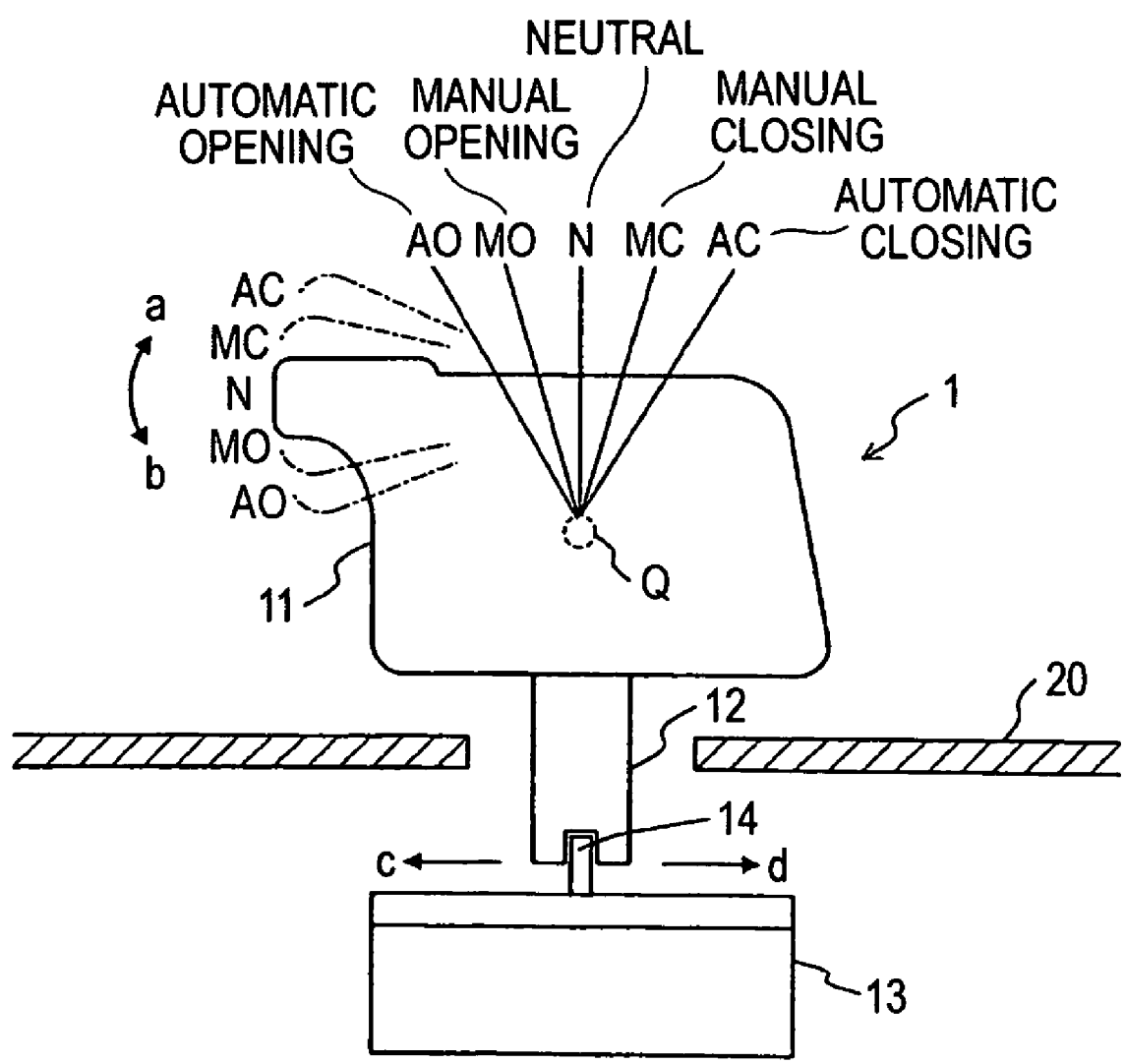
FIG. 2 is a schematic block diagram showing an example of an operation switch.
Figure 3:
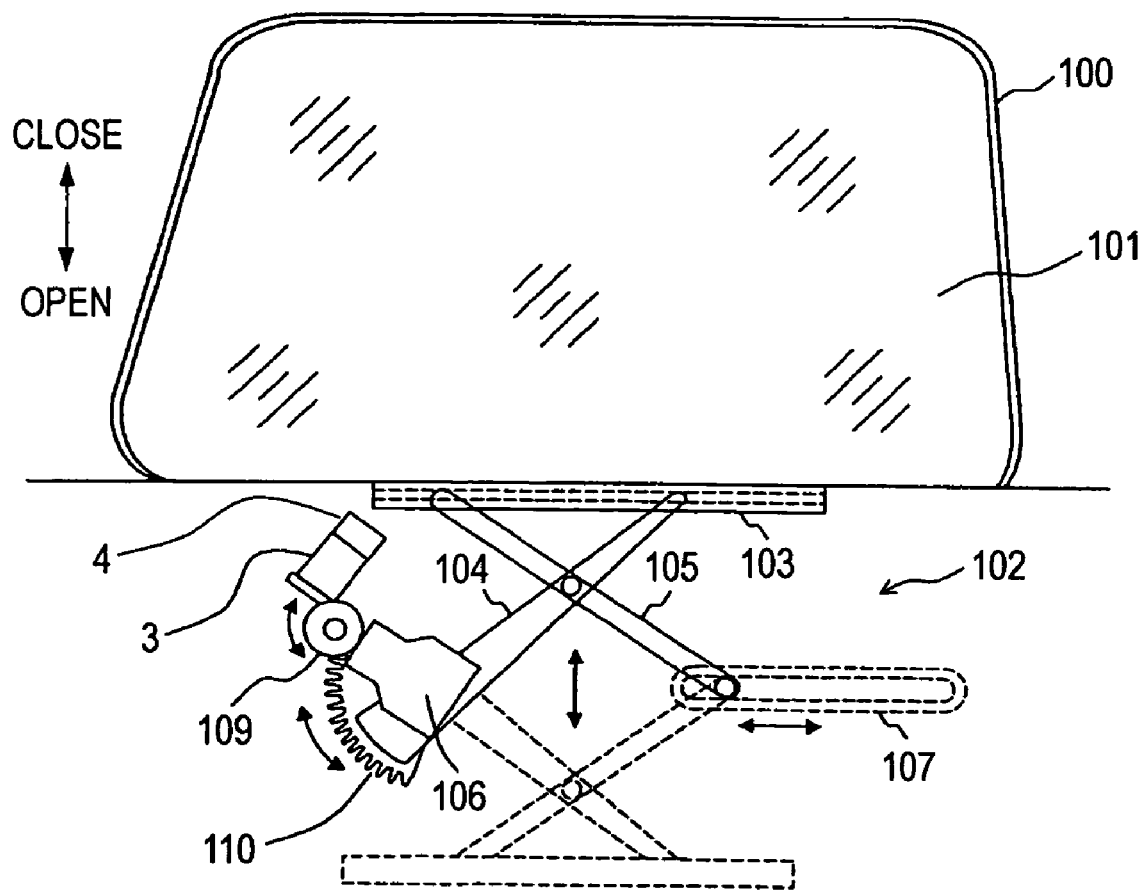
FIG. 3 is a view showing an example of a window opening-and-closing mechanism.
Figure 4:
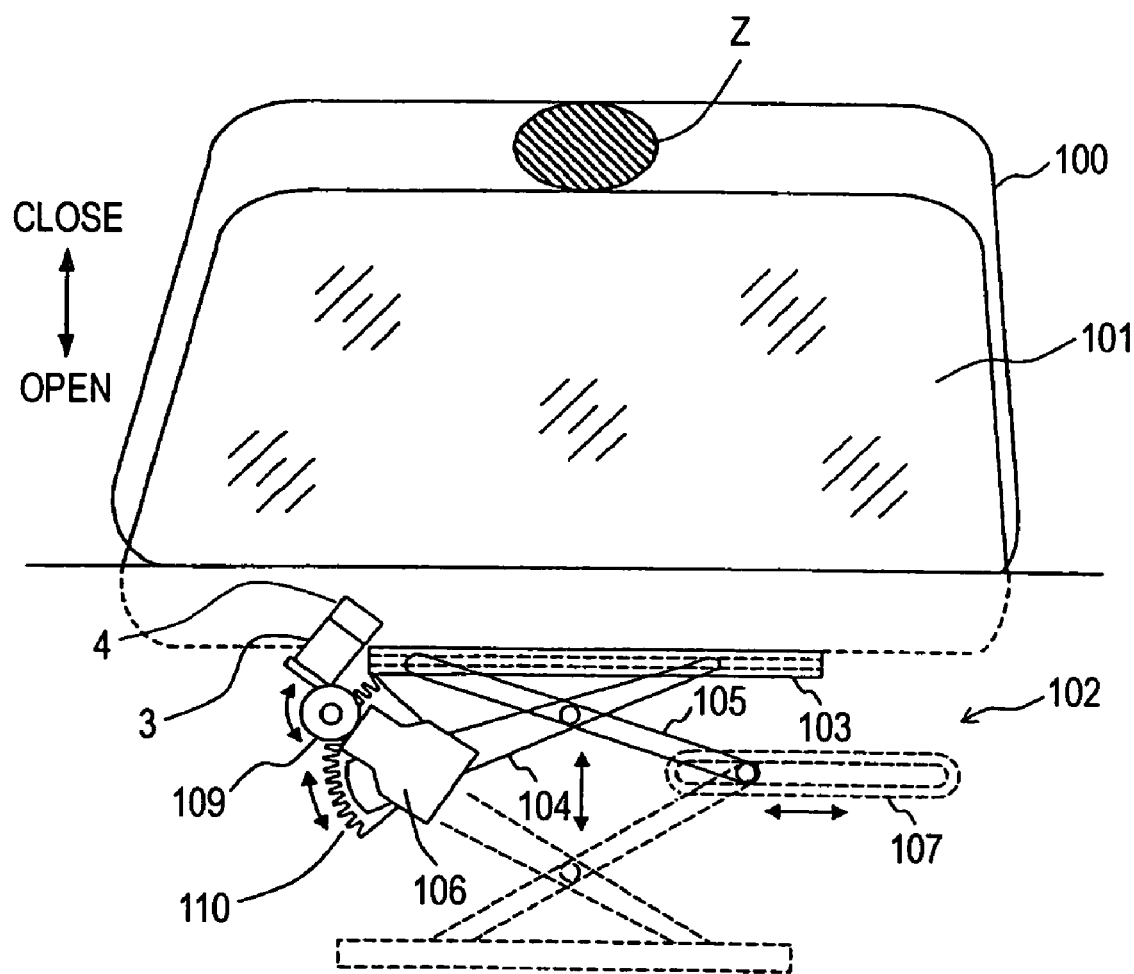
FIG. 4 is a view showing a condition where an object is pinched in a window.

Next, embodiments of the invention will be described with reference to drawings. Hereinafter, FIGS. 1 to 4 described in the section of background art are referred as the embodiments of the invention. FIG. 1 is a block diagram showing an electrical configuration of a power window device as an embodiment of the invention. FIG. 2 is a schematic block diagram showing an example of an operation switch. FIG. 3 is a view showing an example of a window opening-and-closing mechanism provided in each of windows of a vehicle. FIG. 4 is a view showing a condition where an object is pinched in the window in FIG. 3. Since each of the figures has been previously described, overlapped description is omitted here. In FIG. 1, the control section 6 configures manual opening operation control means, manual closing operation control means, automatic opening operation control means, and automatic closing operation control means in one or more embodiments of the invention.

Figure 5:
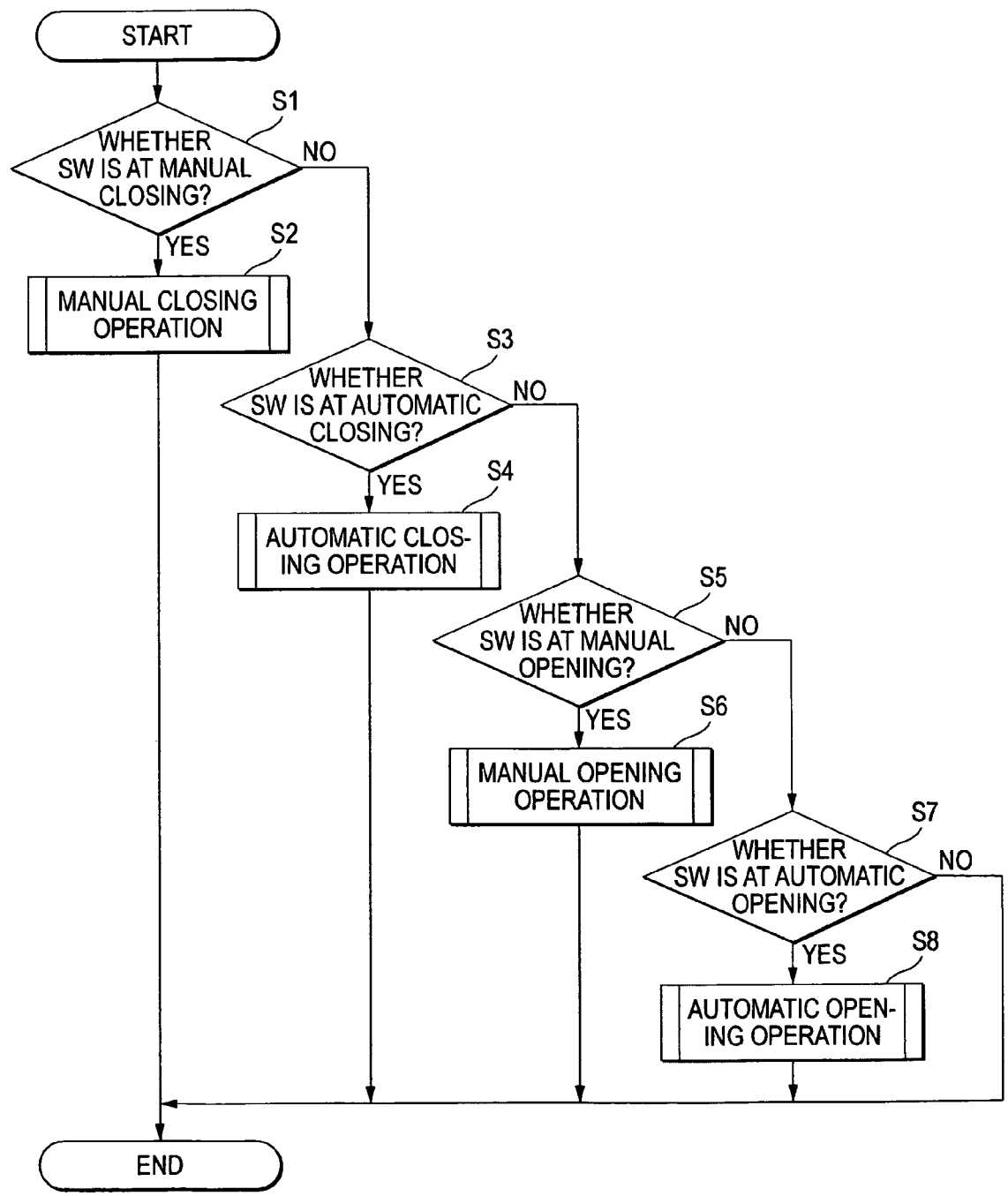
FIG. 5 is a flowchart showing a basic operation of the power window device.
Figure 15:
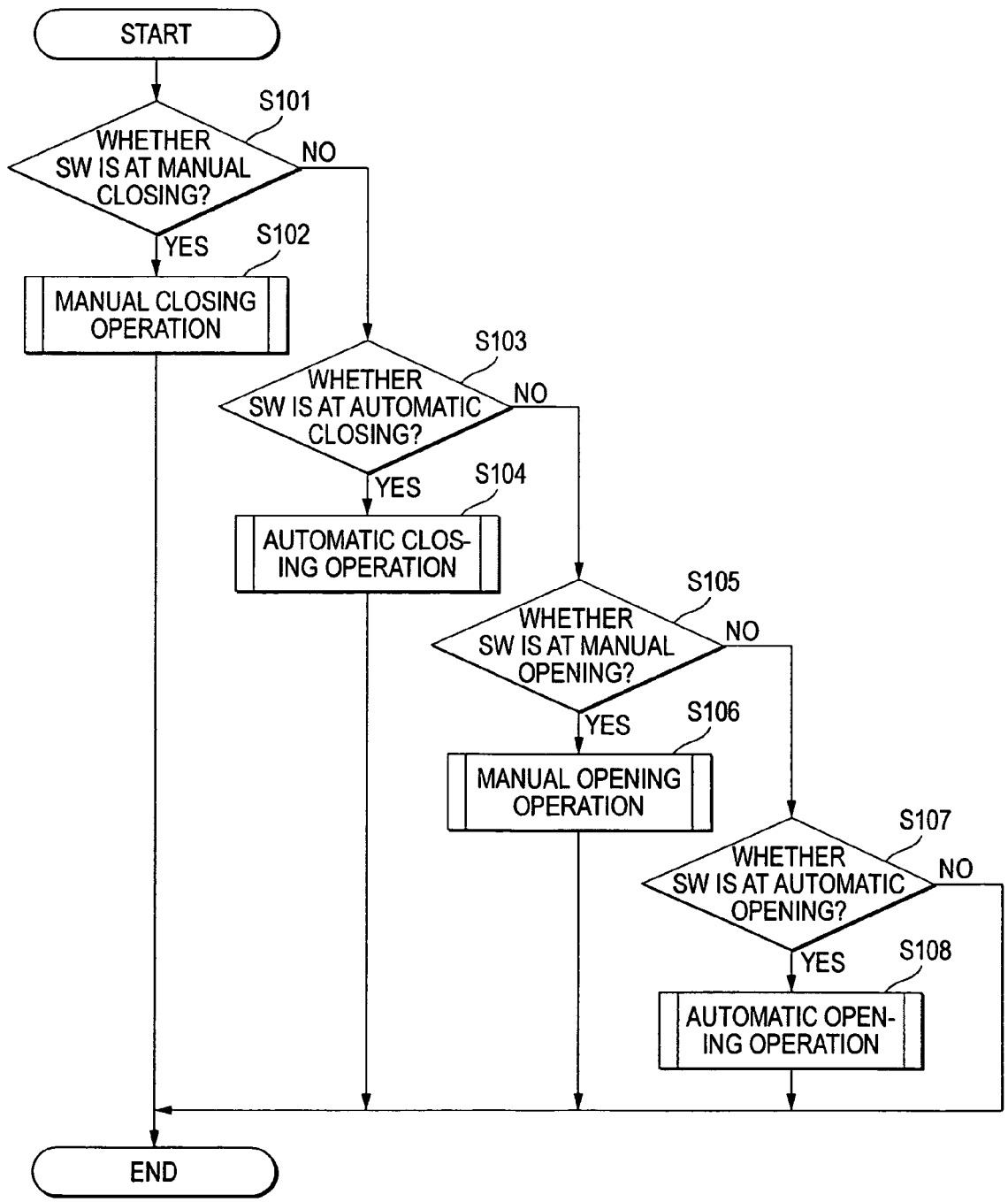
FIG. 15 is a flowchart showing a basic operation of a power window device in the related art.

FIG. 5 is a flowchart showing basic operation of the power window device. When the operation switch 1 is situated in the position of the manual closing MC in step S1, the manual closing operation is performed (step S2); when the operation switch 1 is situated in the position of the automatic closing AC in step S3, the automatic closing operation is performed (step S4); when the operation switch 1 is situated in the position of the manual opening MO in step S5, the manual opening operation is performed (step S6); and when the operation switch 1 is situated in the position of the automatic opening AO in step S7, the automatic opening operation is performed (step S8). Moreover, when the operation switch 1 is not situated in the position of the automatic opening AO in step S7, the operation switch 1 is situated in the position of the neutral N and no operation is performed. The above procedure is not different from the procedure in the related art as shown in FIG. 15.

Figure 6:
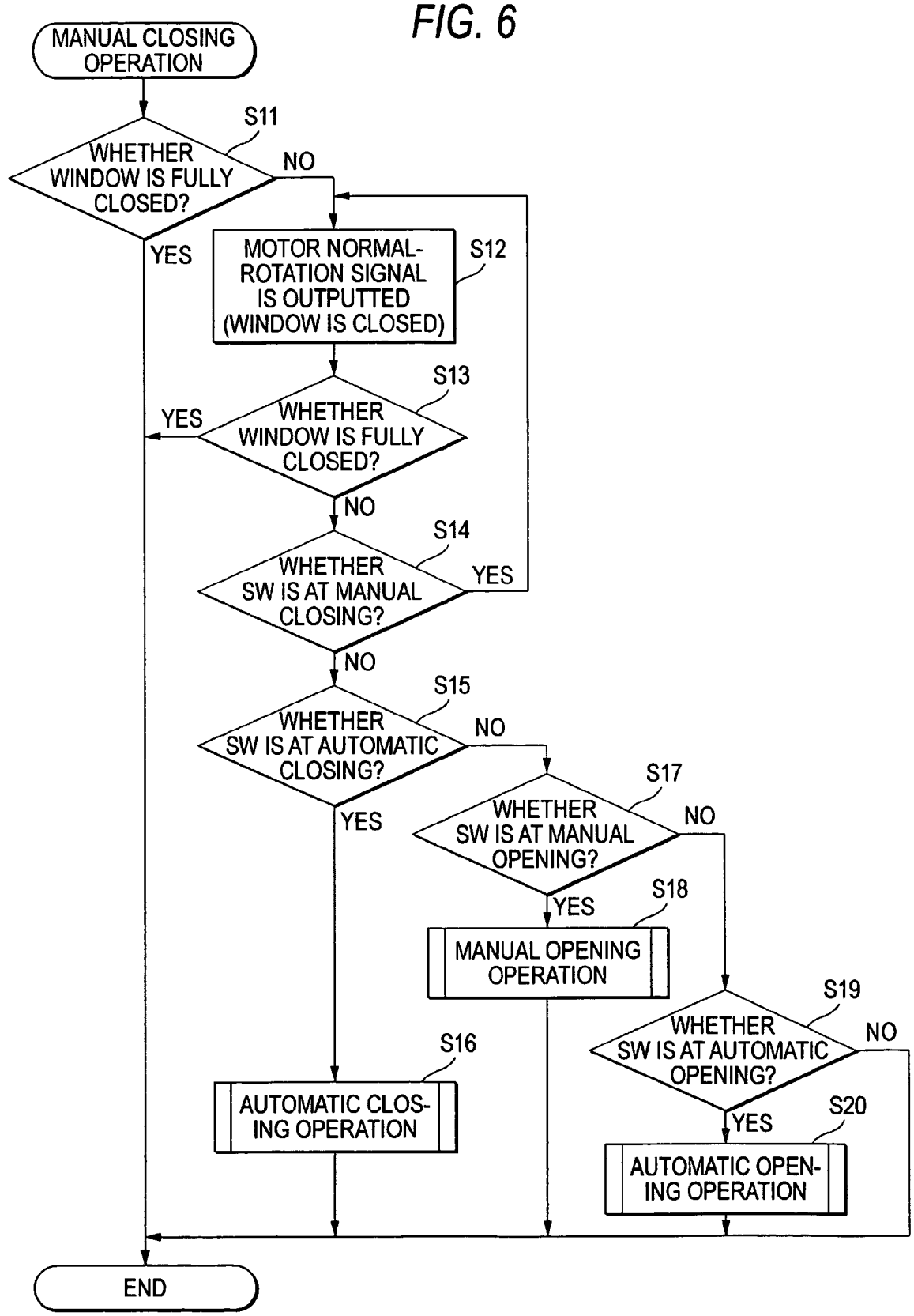
FIG. 6 is a flowchart showing a detailed procedure of manual closing operation.
Figure 16:
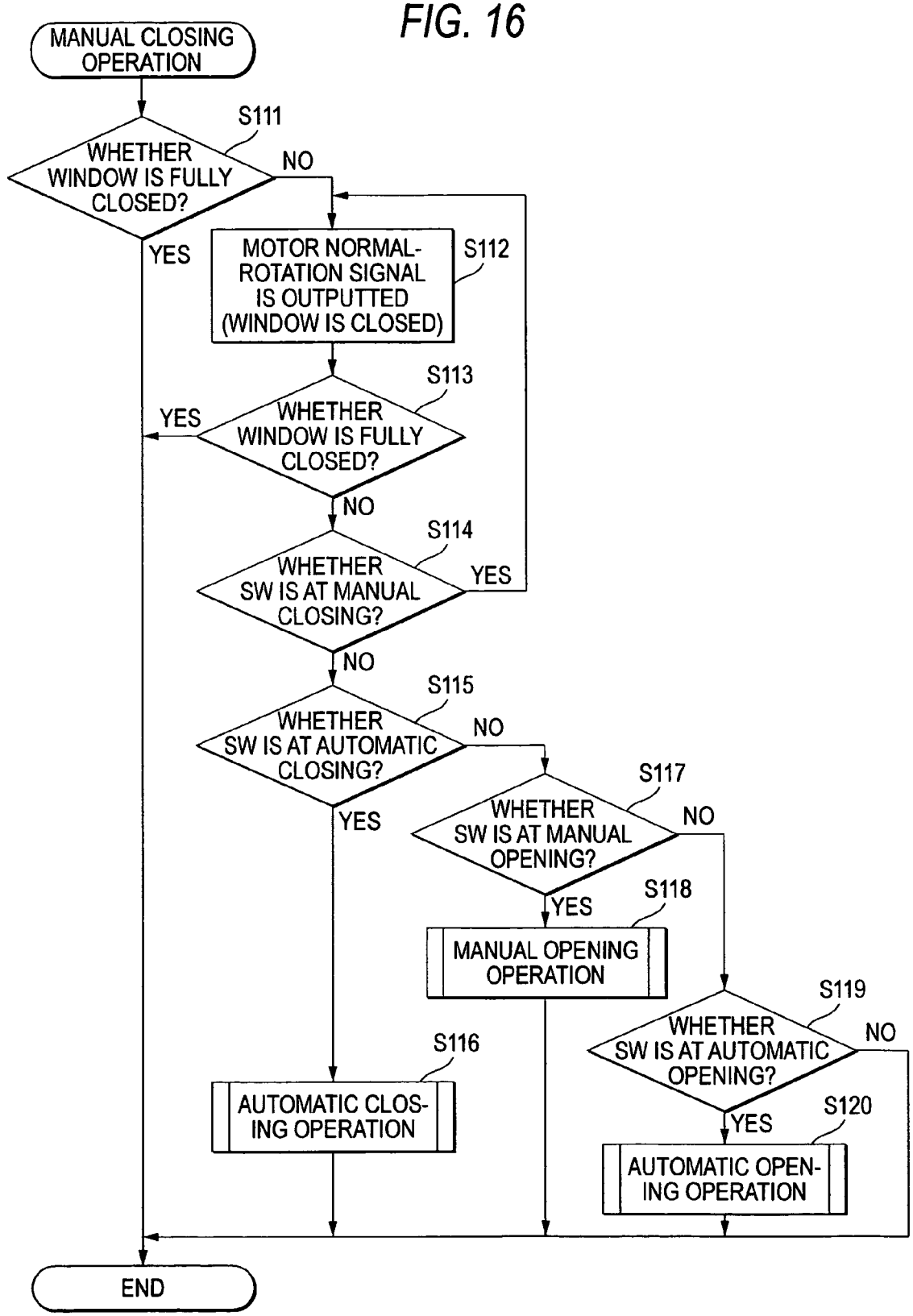
FIG. 16 is a flowchart showing a detailed procedure of manual closing operation in the related art.
Figure 17:
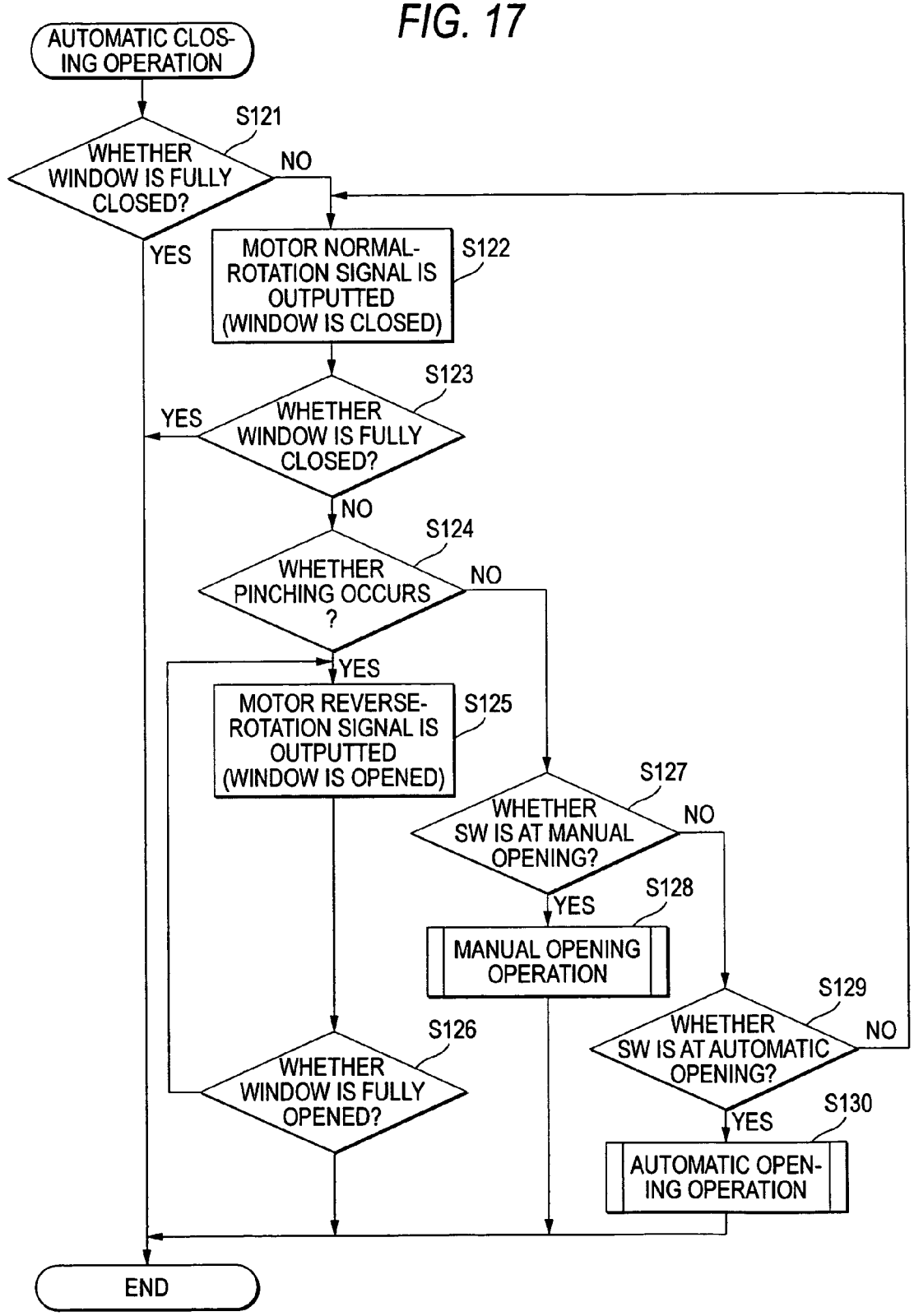
FIG. 17 is a flowchart showing a detailed procedure of automatic closing operation in the related art.

FIG. 6 is a flowchart showing a detailed procedure of the manual closing operation in the step S2 of FIG. 5. The procedure is completely the same as the procedure described in FIG. 16, and steps S11 to S20 in FIG. 6 are corresponding to the steps S111 to S120 in FIG. 16 respectively. Therefore, description for each of the steps is omitted.

Figure 7:
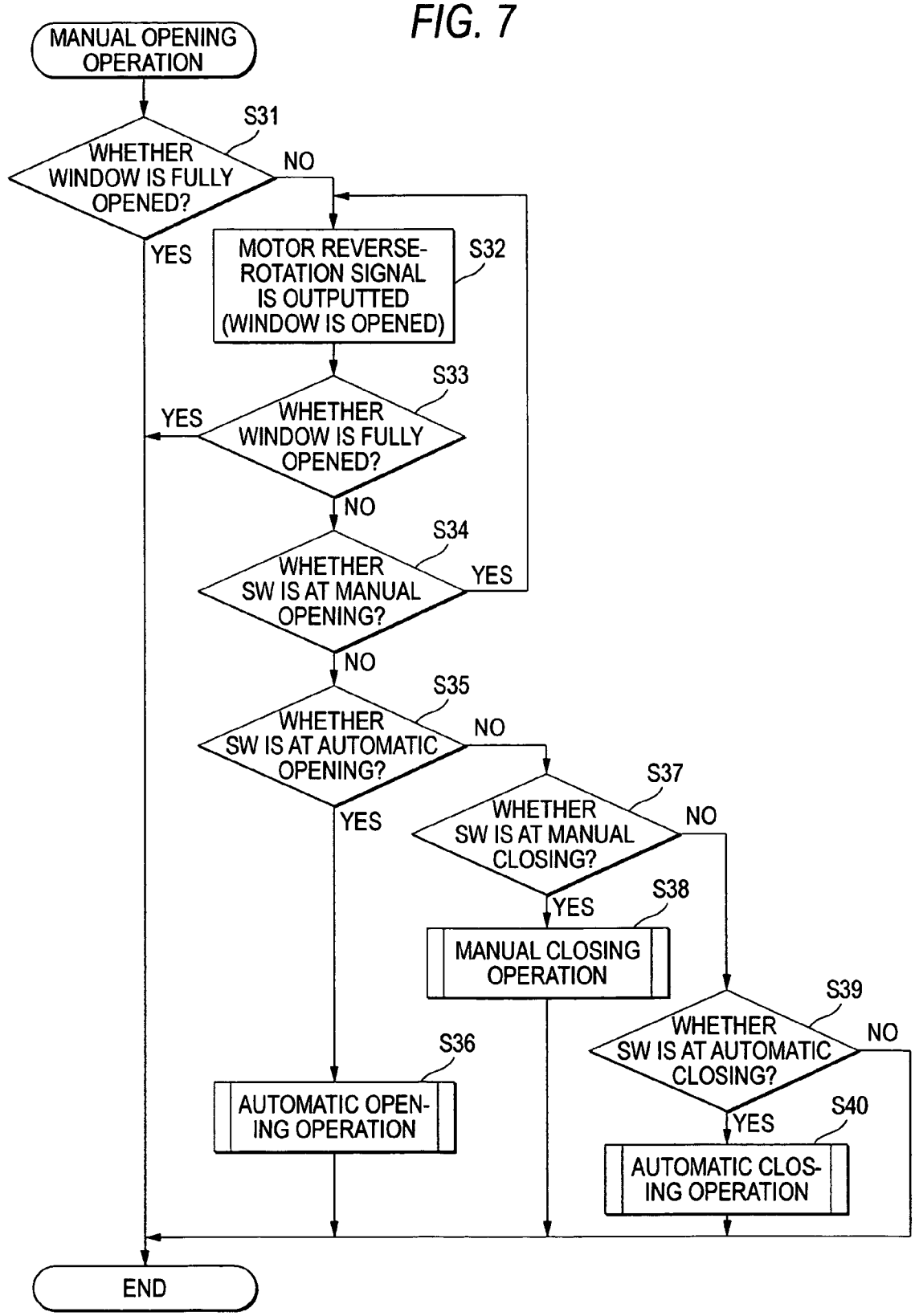
FIG. 7 is a flowchart showing a detailed procedure of manual opening operation.
Figure 18:
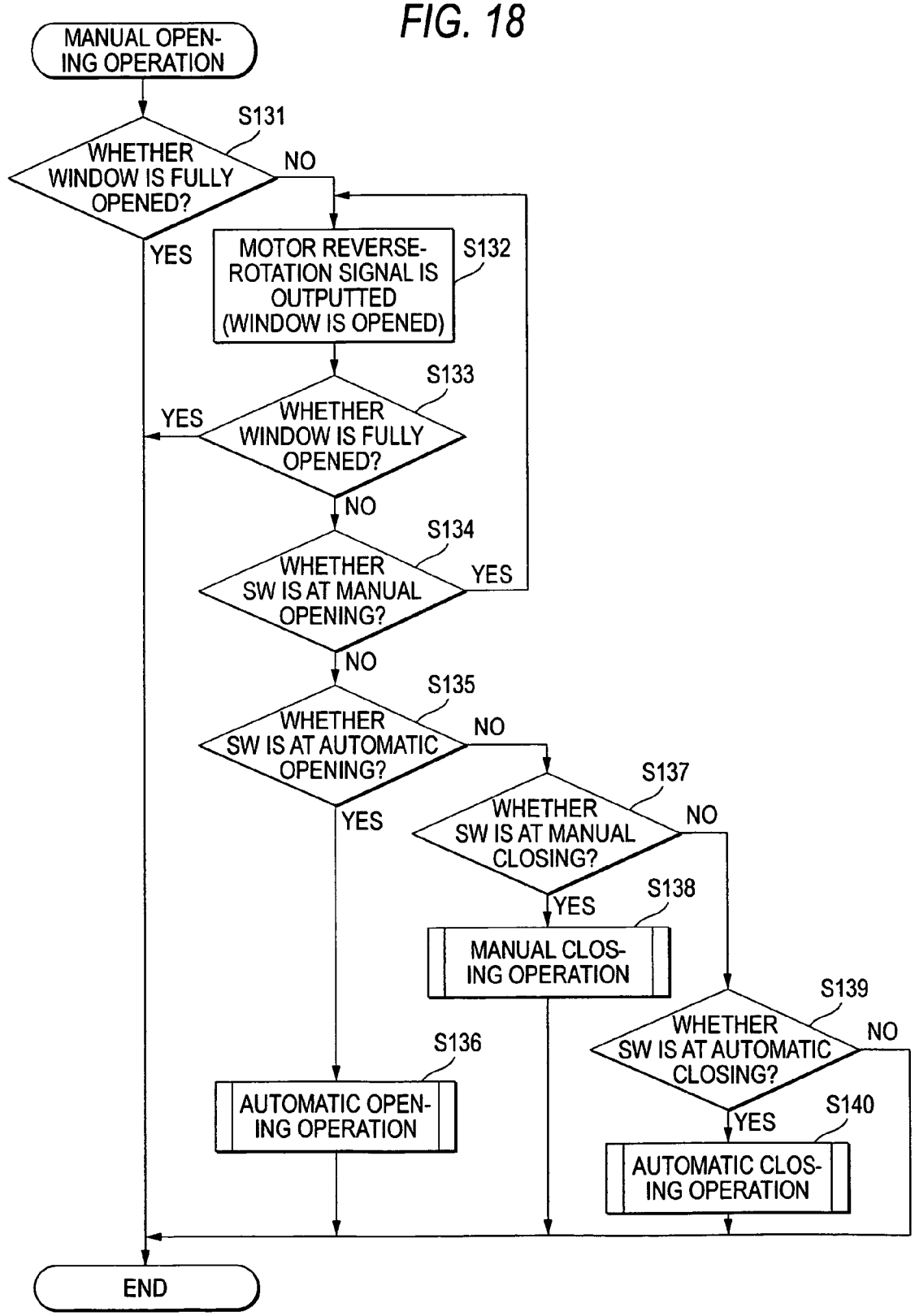
FIG. 18 is a flowchart showing a detailed procedure of manual opening operation in the related art.
Figure 19:
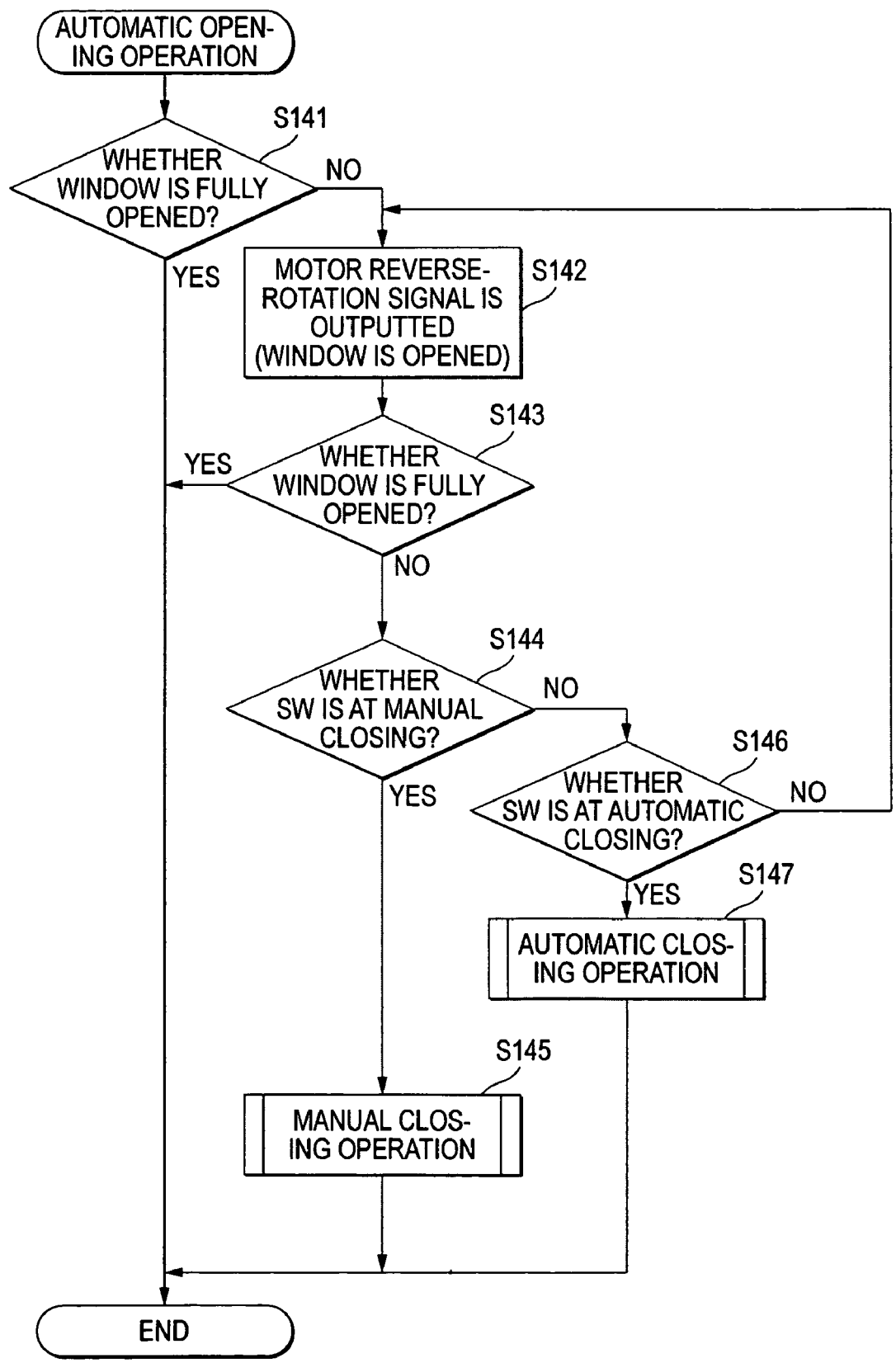
FIG. 19 is a flowchart showing a detailed procedure of automatic opening operation in the related art.

FIG. 7 is a flowchart showing a detailed procedure of the manual opening operation in the step S6 of FIG. 5. The procedure is completely the same as the procedure described in FIG. 18, and steps S31 to S40 in FIG. 7 are corresponding to the steps S131 to S140 in FIG. 18 respectively. Therefore, description for each of the steps is omitted.

Figure 8:
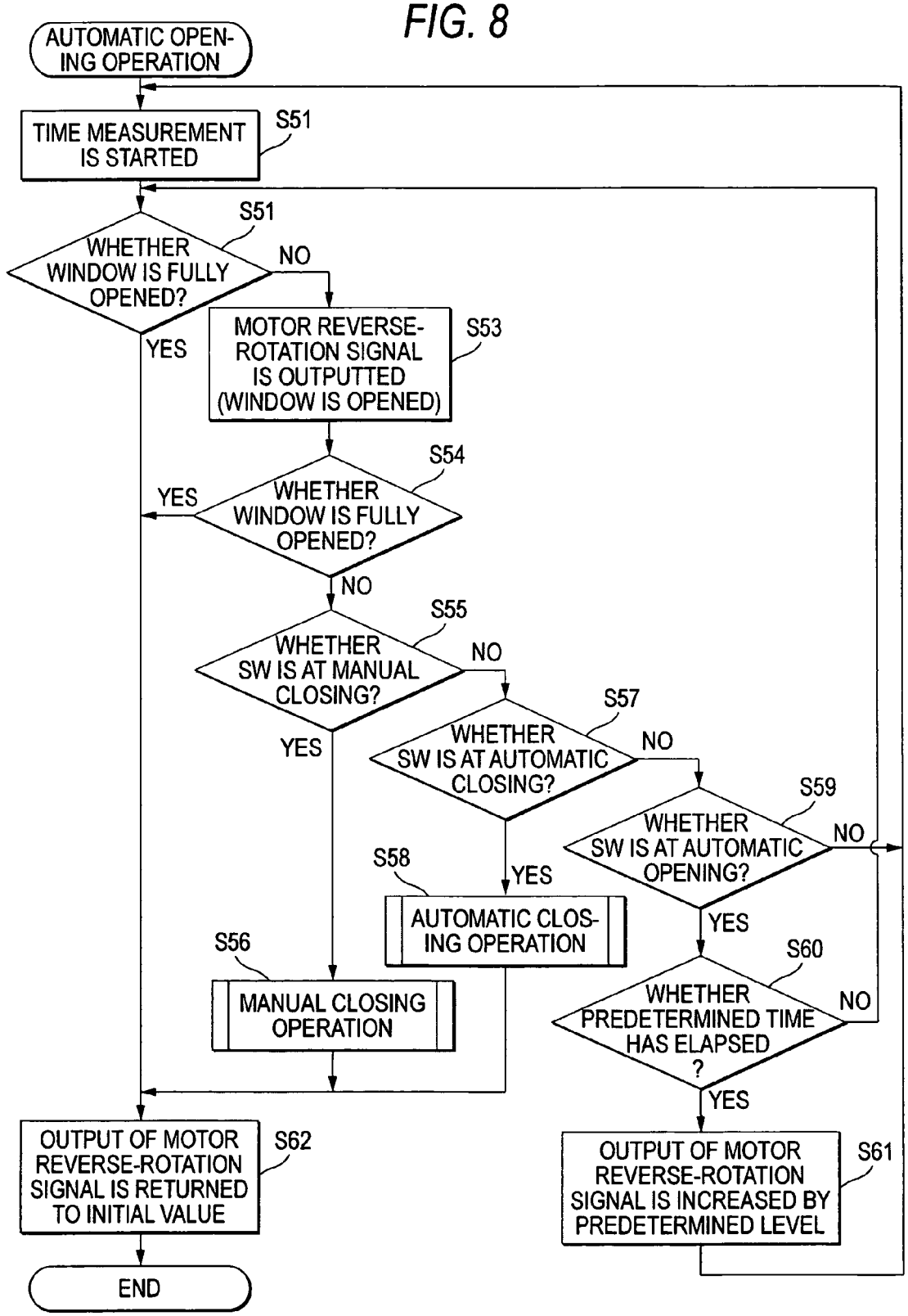
FIG. 8 is a flowchart showing operation of a first embodiment of the invention.

FIG. 8 is a flowchart showing a detailed procedure of the automatic opening operation in the step S8 of FIG. 5, which shows a procedure according to a first embodiment of the invention. The procedure is executed by the CPU configuring the control section 6. When the operation knob 11 is operated to be situated in the position of the automatic opening AO to start the automatic opening operation, a clock 8 starts time measurement at that time point (step S51). Next, whether the window 100 is fully opened in the automatic opening operation is determined based on output of the rotary encoder 4 (step S52). When the window 100 is fully opened (step S52: YES), output of a motor reverse-rotation signal, which is described later, is returned to an initial value (step S62), and thus the operation is finished. When the window 100 is not fully opened (step S52: NO), the reverse rotation signal is outputted from the motor drive circuit 2 to reversely rotate the motor 3, so that the window 100 is opened (step S53). Subsequently, whether the window 100 is fully opened is determined (step S54), and when it is fully opened (step S54: YES), the output of the motor reverse-rotation signal is returned to the initial value (step S62), and thus the operation is finished. When the window 100 is not fully opened (step S54: NO), whether the operation switch 1 is situated in the position of the manual closing MC is determined (step S55).

When the operation switch 1 is situated in the position of the manual closing MC (step S55: YES), the operation is shifted to the manual closing operation as described before (FIG. 6) (step S56), and when it is not situated in the position of the manual closing MC (step S55: NO), whether it is situated in the position of the automatic closing AC is determined (step S57). When the operation switch 1 is situated in the position of the automatic closing AC (step S57: YES), the operation is shifted to automatic closing operation as described later (FIG. 10 and the like) (step S58), and when the operation switch 1 is not situated in the position of the automatic closing AC (step S57: NO), whether the operation switch 1 is situated in the position of the automatic opening AO is determined (step S59). When the switch 1 is also not situated in the position of the automatic opening AO (step S59: NO), it is determined that the switch 1 is situated in the position of the manual opening MO or the neutral N, and the operation is returned to the step S51. On the other hand, when the switch 1 is situated in the position of the automatic opening AO (step S59: YES), whether predetermined time has passed is determined by checking a measurement value of the clock 8 (step S60). When the predetermined time has not passed (step S60: NO), the operation is returned to the step S52.

When the switch 1 is continuously held in the position of the automatic opening AO, and consequently the predetermined time has passed (step S60: YES), the control section 6 provides an instruction to the motor drive circuit 2 to increase the output of the motor reverse-rotation signal by a certain level (step S61). After that, the operation is returned to the step S51, and the clock 8 is reset and then the time measurement is started again. Subsequently, whether the window 100 is fully opened is determined (step S52), and when it is not fully opened (step S52: NO), the reverse rotation signal is outputted from the motor drive circuit 2 to reversely rotate the motor 3, so that the window 100 is opened (step S53). The output of the reverse-rotation signal at that time is output that has been increased in the step S61. Therefore, the output of the signal increases rotation speed of the motor 3, and consequently the window 100 is opened at high speed. After that, the steps S54 to S60 are executed, and when the switch 1 is still continuously held in the position of the automatic opening AO, determination is made as YES in the step 60, and consequently the output of the motor reverse-rotation signal is further increased by the certain level (step S61). Hereinafter, the steps S51 to S61 are repeated in the same way, and as a time period for which the switch 1 is held in the position of the automatic opening AO is increased, the output of the motor reverse-rotation signal is increased and thus rotation frequency of the motor 3 is increased, consequently the window 100 is opened at higher speed.

In this way, in the first embodiment, first the operation knob 11 is operated to start the automatic opening operation, and then when the operation knob 11 is held in the position of the automatic opening AO, the opening speed of the window 100 is increased according to holding time. Therefore, the speed can be increased even while the automatic opening operation is performed, thereby the window 100 can be quickly opened. Moreover, when the hand is released from the operation knob 11 during increasing the speed (step S59: NO), the operation knob 11 is returned from the position of the automatic opening AO to the position of the neutral N, and even in this case, the window 100 continues the automatic opening operation at a speed immediately before releasing, or at a speed set in the step S61 (step S53). Therefore, since the speed immediately before releasing is maintained by releasing the hand from the operation knob 11, the opening speed of the window 100 can be easily adjusted to a desired speed according to the timing at which the hand is released. While the opening speed of the window 100 is increased according to the time period for which the operation knob 11 is held in the position of the automatic opening AO here, the opening speed of the window 100 may be increased according to the time period for which the operation knob 11 is held in the position of the manual opening MO instead. According to the first embodiment, there is given an advantage that since the opening speed of the window 100 can be increased only by holding the operation knob 11 in the predetermined position, the complication that the operation knob 11 needs to be operated many times is eliminated.

Figure 9:
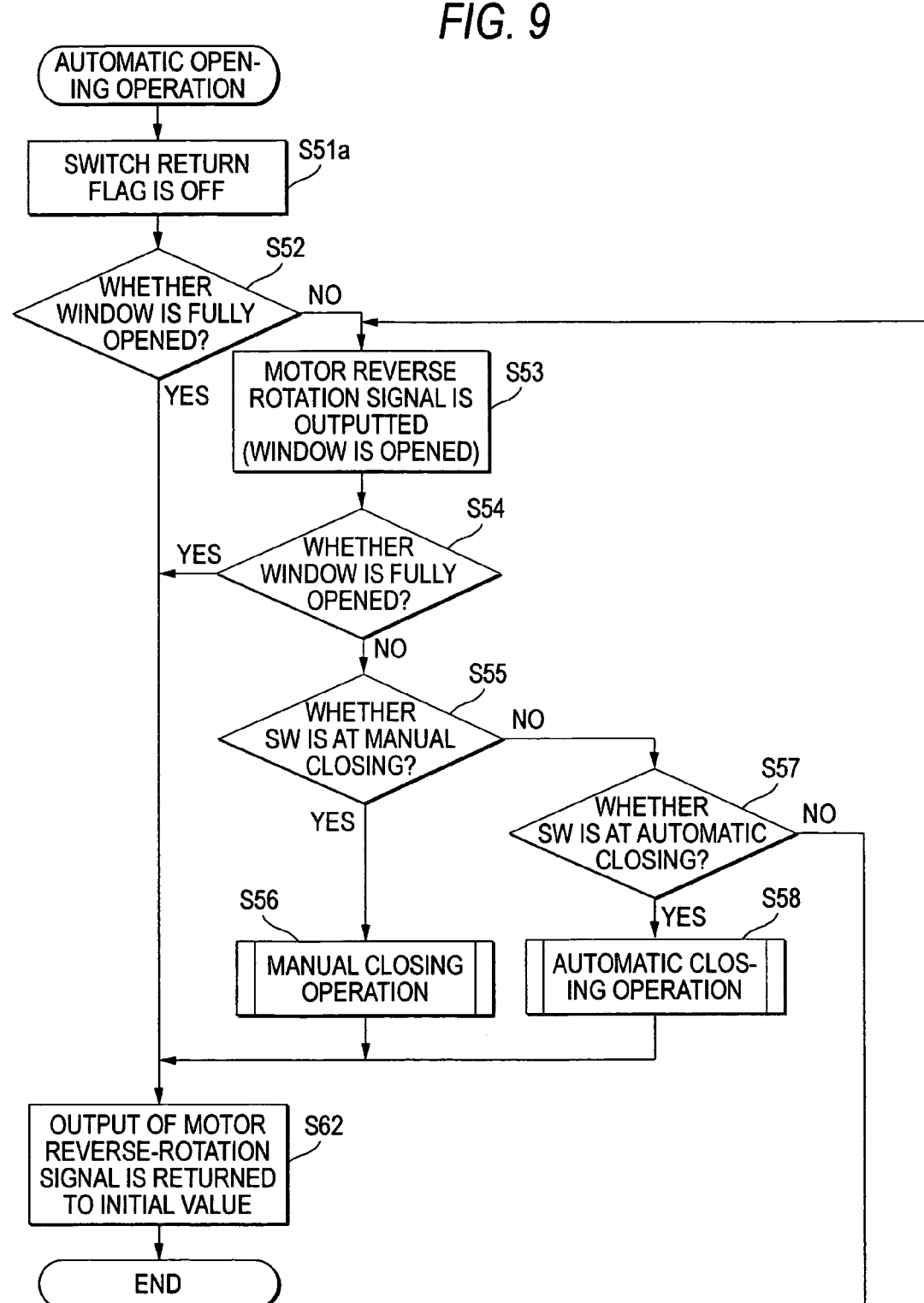
FIG. 9 is a flowchart showing operation of a second embodiment of the invention.

FIG. 9 is a flowchart showing a detailed procedure of the automatic opening operation in the step S8 of FIG. 5, which shows a procedure according to a second embodiment of the invention. The procedure is executed by the CPU configuring the control section 6. In FIG. 9, the same step as in FIG. 8 is marked with the same sign. When the operation knob 11 is operated to be situated in the position of the automatic opening AO to start the automatic opening operation, a switch-return-flag is turned off (step S51a). The switch-return-flag herein means information indicating whether the operation knob 11 is returned from the position of the automatic opening AO to a position other than that (for example, the position of the neutral N or the position of the manual opening MO). Next, whether the window 100 is fully opened in the automatic opening operation is determined based on the output of the rotary encoder 4 (step S52). When the window 100 is fully opened (step S52: YES), the output of the motor reverse-rotation signal, which is described later, is returned to the initial value (step S62), and thus the operation is finished. When the window 100 is not fully opened (step S52: NO), a reverse rotation signal is outputted from the motor drive circuit 2 to reversely rotate the motor 3, so that the window 100 is opened (step S53). Subsequently, whether the window 100 is fully opened is determined (step S54), and when it is fully opened (step S54: YES), the output of the motor reverse-rotation signal is returned to the initial value (step S62), and thus the operation is finished. When the window 100 is not fully opened (step S54: NO), whether the operation switch 1 is situated in the position of the manual closing MC is determined (step S55).

When the operation switch 1 is situated in the position of the manual closing MC (step S55: YES), the operation is shifted to the manual closing operation as described above (FIG. 6) (step S56), and when it is not situated in the position of the manual closing MC (step S55: NO), whether it is situated in the position of the automatic closing AC is determined (step S57). When the operation switch 1 is situated in the position of the automatic closing AC (step S57: YES), the operation is shifted to the automatic closing operation as described later (FIG. 10 and the like) (step S58), and when the operation switch 1 is not situated in the position of the automatic closing AC (step S57: NO), whether the operation switch 1 is situated in the position of the automatic opening AO is determined (step S59). When the switch 1 is also not situated in the position of the automatic opening AO (step S59: NO), it is determined that the switch 1 is returned to the position of the neutral N (or the manual opening MO), and the switch-return-flag is turned on (step S63), and then the operation is returned to the step S53.

When the switch 1 is situated in the position of the automatic opening AO (step S59: YES), whether the switch-return-flag is on is determined (step S60a). When the switch-return-flag is not on (step S60a: NO), the operation is returned to the step S53 to continue the operation of opening the window 100. On the other hand, when the switch-return-flag is on (step S60a: YES), the control section 6 determines that the operation switch 1 is temporarily returned from the position of the automatic opening AO to the position of the neutral N (or the manual opening MO)

and operated to be situated in the position of the automatic opening AO again, and provides an instruction to the motor drive circuit 2 to increase the output of the motor reverse-rotation signal by the certain level (step S61). Subsequently, the control section turns off the switch-return-flag (step S61a), and then returns to the step S53 in order to output the reverse rotation signal from the motor drive circuit 2 to reversely rotate the motor 3, so that the window 100 is opened. The output of the reverse rotation signal at that time is output that has been increased in the step S61. Therefore, the output of the signal increases the rotation speed of the motor 3, and consequently the window 100 is opened at high speed. After that, the switch 1 is returned to the position of the neutral N (or the manual opening MO) again (step S59: NO), and then the switch-return-flag is turned on (step S63), and then when the switch is operated to be situated in the position of the automatic opening AO again (step S59: YES), determination is made as YES in the step 60a, and consequently the output of the motor reverse-rotation signal is further increased by the certain level (step S61). Hereinafter, the steps S53 to S63 are repeated in the same way, and every time when the switch 1 is returned to the position of the neutral N (or the manual opening MO) and then operated to be situated in the position of the automatic opening AO again, the output of the motor reverse-rotation signal is increased and thus rotation frequency of the motor 3 is increased, consequently the window 100 is opened at higher speed.

In this way, in the second embodiment, first the operation knob 11 is operated to start the automatic opening operation, then when the operation knob 11 is temporarily returned to a position other than the automatic opening AO and then operated to be situated in the position of the automatic opening AO again, the opening speed of the opening-and-closing body is increased according to the number of operation. Therefore, the speed can be increased even while the automatic opening operation is performed, thereby the window 100 can be quickly opened. Moreover, when the hand is released from the operation knob 11 during increasing the speed (step S59: NO), the operation knob is returned from the position of the automatic opening AO to the position of the neutral N, and even in this case, the window 100 continues the automatic opening operation at a speed immediately before releasing, or at the speed set in the step S61 (step S53). Therefore, since the speed immediately before releasing is maintained by releasing the hand from the operation knob 11, the opening speed of the window 100 can be easily adjusted to the desired speed according to the timing at which the hand is released. While the opening speed of the window 100 is increased according to the number of operation that the operation knob 11 is situated in the position of the automatic opening AO here, the opening speed of the window 100 may be increased according to the number of operation that the operation knob 11 is situated in the position of the manual opening MO instead. According to the second embodiment, there is given an advantage that since the operation knob 11 need not be continuously pushed until the predetermined time passes, time for increasing the opening speed of the window 100 can be reduced.

Figure 10:
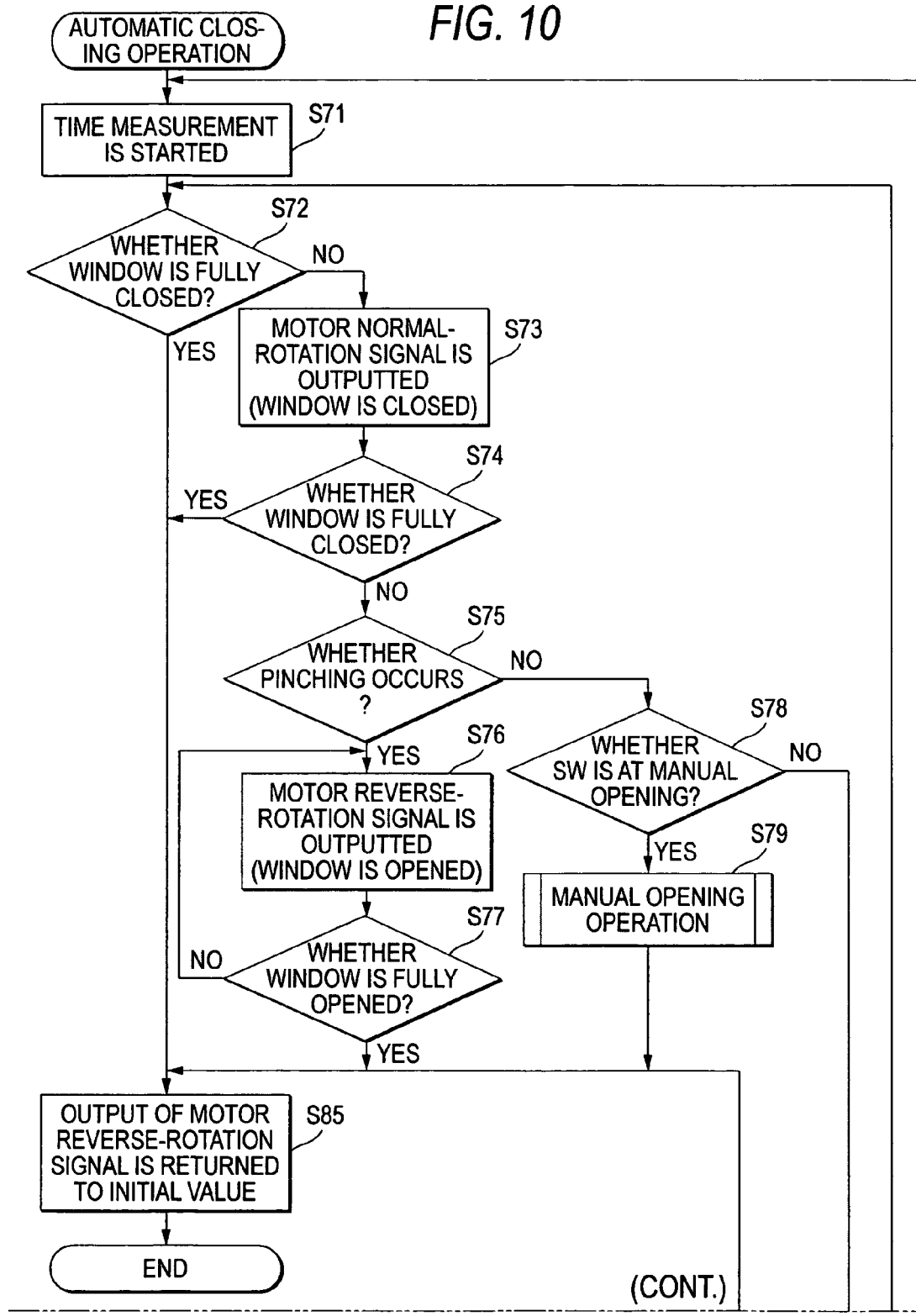
FIG. 10 is a flowchart showing operation of a third embodiment of the invention.

FIG. 10 is a flowchart showing a detailed procedure of the automatic closing operation in the step S4 of FIG. 5, which shows a procedure according to a third embodiment of the invention. The procedure is executed by the CPU configuring the control section 6. When the operation knob 11 is operated to be situated in the position of the automatic closing AC and thus the automatic closing operation is started, a clock 8 starts time measurement at that time point (step S71). Next, whether the window 100 is fully closed in the automatic closing operation is determined based on the output of the rotary encoder 4 (step S72). When the window 100 is fully closed (step S72: YES), output of a motor normal-rotation signal, which is described later, is returned to an initial value (step S85), and thus the operation is finished. When the window 100 is not fully closed (step S72: NO), the normal rotation signal is outputted from the motor drive circuit 2 to normally rotate the motor 3, so that the window 100 is closed (step S73). Subsequently, whether the window 100 is fully closed is determined (step S74), and when it is fully closed (step S74: YES), the output of the motor normal-rotation signal is returned to the initial value (step S85), and thus the operation is finished.

When the window 100 is not fully closed (step S74: NO), whether pinching has occurred is determined (step S75). When the pinching of the object Z as shown in FIG. 4 has occurred (step S75: YES), the reverse-rotation signal is outputted from the motor drive circuit 2 to reversely rotate the motor 3, so that the window 100 is opened (step S76). Then, whether the window 100 is fully opened is determined (step S77), and when it is fully opened (step S77: YES), the step S85 is executed and thus the operation is finished, and when it is not fully opened (step S77: NO), the operation is returned to the step S76 to continue the operation of opening the window 100.

When the pinching is not detected in the step S75 (step S75: NO), whether the operation switch 1 is situated in the position of the manual opening MO is determined (step S78). When the operation switch 1 is situated in the position of the manual opening MO (step S78: YES), the operation is shifted to the manual opening operation as described before (FIG. 7) (step S79), and when it is not situated in the position of the manual opening MO (step S78: NO), whether it is situated in the position of the automatic opening AO is determined (step S80). When the operation switch 1 is situated in the position of the automatic opening AO (step S80: YES), the operation is shifted to the automatic opening operation as described before (FIG. 8 and FIG. 9) (step S81), and when the operation switch 1 is not situated in the position of the automatic opening AO (step S80: NO), whether it is situated in the position of the automatic closing AC is determined (step S82). When the operation switch 1 is also not situated in the position of the automatic closing AC (step S82: NO), it is determined that the switch 1 is situated in the position of the manual closing MC or the neutral N, the operation is returned to the step S71. On the other hand, when the switch 1 is situated in the position of the automatic closing AC (step S82: YES), whether predetermined time has passed is determined by checking a measurement value of the clock 8 (step S83). When the predetermined time has not passed (step S83: NO), the operation is returned to the step S72.

When the switch 1 is continuously held in the position of the automatic closing AC, and consequently the predetermined time has passed (step S83: YES), the control section 6 provides an instruction to the motor drive circuit 2 to increase the output of the motor normal-rotation signal by a certain level (step S84). After that, the operation is returned to the step S71, and the clock 8 is reset and then the time measurement is started again. Subsequently, whether the window 100 is fully closed is determined (step S72), and when it is not fully closed (step S72: NO), the normal rotation signal is outputted from the motor drive circuit 2 to normally rotate the motor 3, so that the window 100 is closed (step S73). The output of the normal-rotation signal at that time is output that has been increased in the step S84.

Therefore, the output of the signal increases the rotation speed of the motor 3, and consequently the window 100 is closed at high speed. After that, the steps S74 to S83 are executed, and when the switch 1 is still continuously held in the position of the automatic closing AC, determination is made as YES in the step 83, and consequently the output of the motor normal-rotation signal is further increased by the certain level (step S84). Hereinafter, the steps S71 to S84 are repeated in the same way, and as a time period for which the switch 1 is held in the position of the automatic closing AC is increased, the output of the motor normal-rotation signal is increased and thus the rotation frequency of the motor 3 is increased, consequently the window 100 is closed at higher speed.

In this way, in the third embodiment, first the operation knob 11 is operated to start the automatic closing operation, and then when the operation knob 11 is held in the position of the automatic closing AC, the closing speed of the window 100 is increased according to holding time. Therefore, the speed can be increased even while the automatic closing operation is performed, thereby the window 100 can be quickly closed. Moreover, when the hand is released from the operation knob 11 during increasing the speed (step S82: NO), the operation knob 11 is returned from the position of the automatic closing AC to the position of the neutral N, and even in this case, the window 100 continues the automatic closing operation at a speed immediately before releasing, or at a speed set in the step S84 (step S73). Therefore, since the speed immediately before releasing is maintained by releasing the hand from the operation knob 11, the closing speed of the window 100 can be easily adjusted to a desired speed according to the timing at which the hand is released. While the speed of the window 100 is increased according to the time period for which the operation knob 11 is held in the position of the automatic closing AC here, the speed of the window 100 may be increased according to the time period for which the operation knob 11 is held in the position of the manual closing MC instead. According to the third embodiment, there is given an advantage that since the closing speed of the window 100 can be increased only by holding the operation knob 11 in the predetermined position, the complication that the operation knob 11 needs to be operated many times is eliminated.

Figure 11:
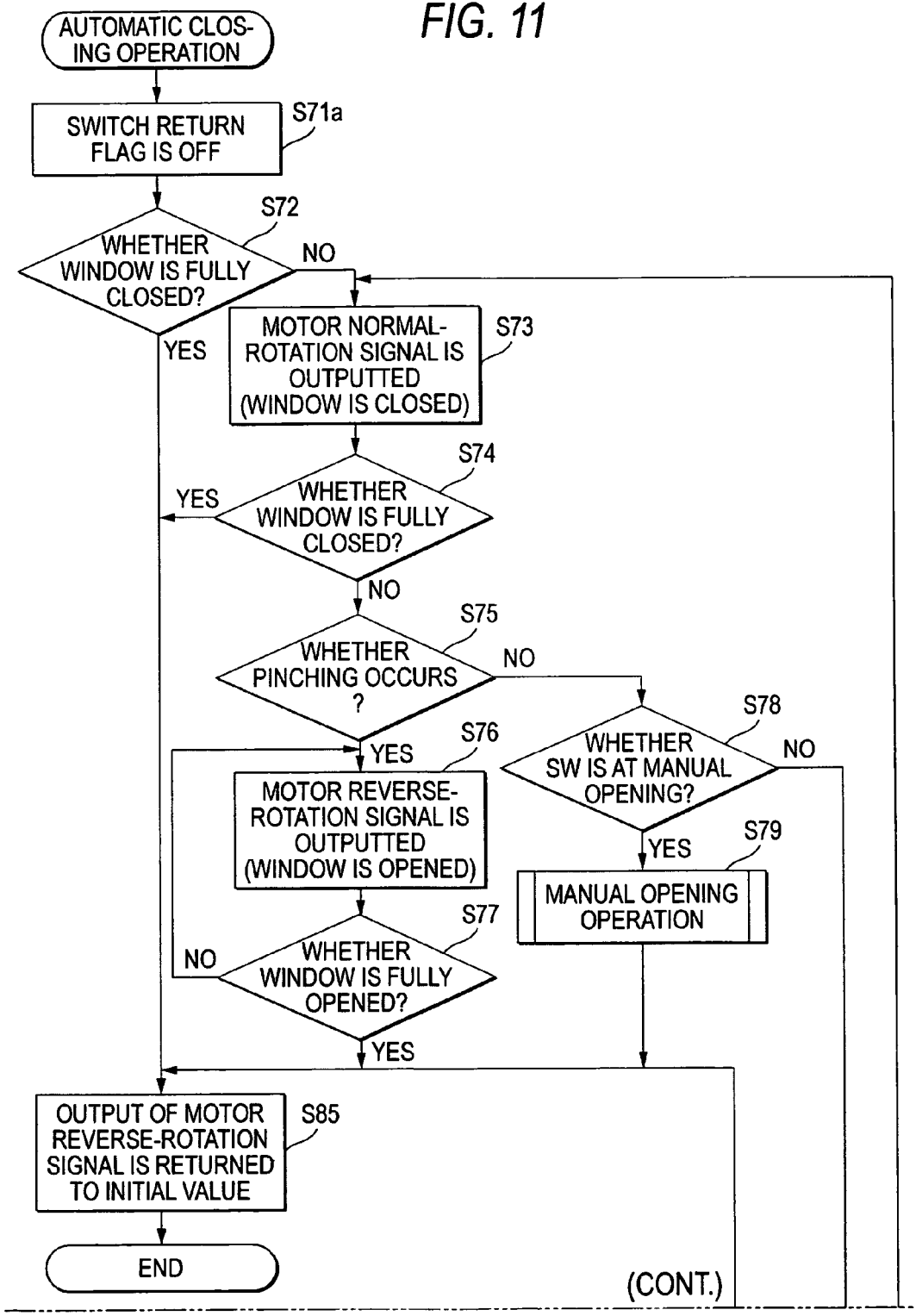
FIG. 11 is a flowchart showing operation of a fourth embodiment of the invention.

FIG. 11 is a flowchart showing a detailed procedure of the automatic closing operation in the step S4 of FIG. 5, which shows a procedure according to a fourth embodiment of the invention. The procedure is executed by the CPU configuring the control section 6. In FIG. 11, the same step as in FIG. 10 is marked with the same sign. When the operation knob 11 is operated to be situated in the position of the automatic closing AC to start the automatic closing operation, a switch-return-flag is turned off (step S71*a*). The switch-return-flag herein means information indicating whether the operation knob 11 is returned from the position of the automatic closing AC to a position other than that (for example, the position of the neutral N or the position of the manual closing MC). Next, whether the window 100 is fully closed in the automatic closing operation is determined based on the output of the rotary encoder 4 (step S72). When the window 100 is fully closed (step S72: YES), the output of the motor normal-rotation signal, which is described later, is returned to the initial value (step S85), and thus the operation is finished. When the window 100 is not fully closed (step S72: NO), a normal rotation signal is outputted from the motor drive circuit 2 to normally rotate the motor 3, so that the window 100 is closed (step S73). Subsequently, whether the window 100 is fully closed is determined (step S74), and when it is fully closed (step S74: YES), the output of the motor normal-rotation signal is returned to the initial value (step S85), and thus the operation is finished.

When the window 100 is not fully closed (step S74: NO), whether the pinching has occurred is determined (step S75). When the pinching of the object Z as shown in FIG. 4 has occurred (step S75: YES), the reverse-rotation signal is outputted from the motor drive circuit 2 to reversely rotate the motor 3, so that the window 100 is opened (step S76). Then, whether the window 100 is fully opened is determined (step S77), and when it is fully opened (step S77: YES), the step S85 is executed and thus the operation is finished, and when it is not fully opened (step S77: NO), the operation is returned to the step S76 to continue the operation of opening the window 100.

When the pinching is not detected in the step S75 (step S75: NO), whether operation switch 1 is situated in the position of the manual opening MO is determined (step S78). When the operation switch 1 is situated in the position of the manual opening MO (step S78: YES), the operation is shifted to the manual opening operation as described before (FIG. 7) (step S79), and when it is not situated in the position of the manual opening MO (step S78: NO), whether it is situated in the position of the automatic opening AO is determined (step S80). When the operation switch 1 is situated in the position of the automatic opening AO (step S80: YES), the operation is shifted to the automatic opening operation as described before (FIG. 8 and FIG. 9) (step S81), and when the operation switch 1 is not situated in the position of the automatic opening AO (step S80: NO), whether it is situated in the position of the automatic closing AC is determined (step S82). When the operation switch 1 is also not situated in the position of the automatic closing AC (step S82: NO), it is determined that the switch 1 is returned to the position of the neutral N (or the manual closing MC), and the switch-return-flag is turned on (step S86), and then the operation is returned to the step S73.

When the switch 1 is situated in the position of the automatic closing AC (step S82: YES), whether the switch-return-flag is on is determined (step S83*a*). When the switch-return-flag is not on (step S83*a*: NO), the operation is returned to the step S73 to continue the operation of opening the window 100. On the other hand, when the switch-return-flag is on (step S83*a*: YES), the control section 6 determines that the operation switch 1 is temporarily returned from the position of the automatic closing AC to the position of the neutral N (or the manual closing MC) and operated to be situated in the position of the automatic closing AC again, and provides an instruction to the motor drive circuit 2 to increase the output of the motor normal-rotation signal by the certain level (step S84). Subsequently, the control section turns off the switch-return-flag (step S84*a*), and then returns to the step S73 in order to output the normal rotation signal from the motor drive circuit 2 to normally rotate the motor 3, so that the window 100 is closed. The output of the normal rotation signal at that time is output that has been increased in the step S84. Therefore, the output of the signal increases the rotation speed of the motor 3, and consequently the window 100 is closed at high speed. After that, the switch 1 is returned to the position of the neutral N (or the manual closing MC) again (step S82: NO), and then the switch-return-flag is turned on (step S86), and then when the switch is operated to be situated in the position of the automatic closing AC again (step S82: YES), determination is made as YES in the step 83*a*, and consequently the output of the motor normal-rotation signal is further increased by the certain level (step S84). Hereinafter, the steps S73 to S86 are repeated in the same way, and every time when the switch 1 is returned to the position of the neutral N (or the manual closing MC) and then operated to be situated in the position of the automatic closing AC again, the output of the motor closing-rotation signal is increased and thus the rotation frequency of the motor 3 is increased, consequently the window 100 is closed at higher speed.

In this way, in the fourth embodiment, first the operation knob 11 is operated to start the automatic closing operation, and then when the operation knob 11 is temporarily returned to a position other than the automatic closing AC and then operated to be situated in the position of the automatic closing AC again, the closing speed of the opening-and-closing body is increased according to the number of operation. Therefore, the speed can be increased even while the automatic closing operation is performed, thereby the window 100 can be quickly closed. Moreover, when the hand is released from the operation knob 11 during increasing the speed (step S82: NO), the operation knob 11 is returned from the position of the automatic closing AC to the position of the neutral N, and even in this case, the window 100 continues the automatic closing operation at a speed immediately before releasing, or at the speed set in the step S84 (step S73). Therefore, since the speed immediately before releasing is maintained by releasing the hand from the operation knob 11, the opening speed of the window 100 can be easily adjusted to the desired speed according to the timing at which the hand is released. While the speed of the window 100 is increased according to the number of operation that the operation knob 11 is situated in the position of the automatic closing AC here, the speed of the window 100 may be increased according to the number of operation that the operation knob 11 is situated in the position of the manual closing MC instead. According to the fourth embodiment, there is given an advantage that since the operation knob 11 need not be continuously pushed until the predetermined time passes, time for increasing the closing speed of the window 100 can be reduced.

Figure 12:
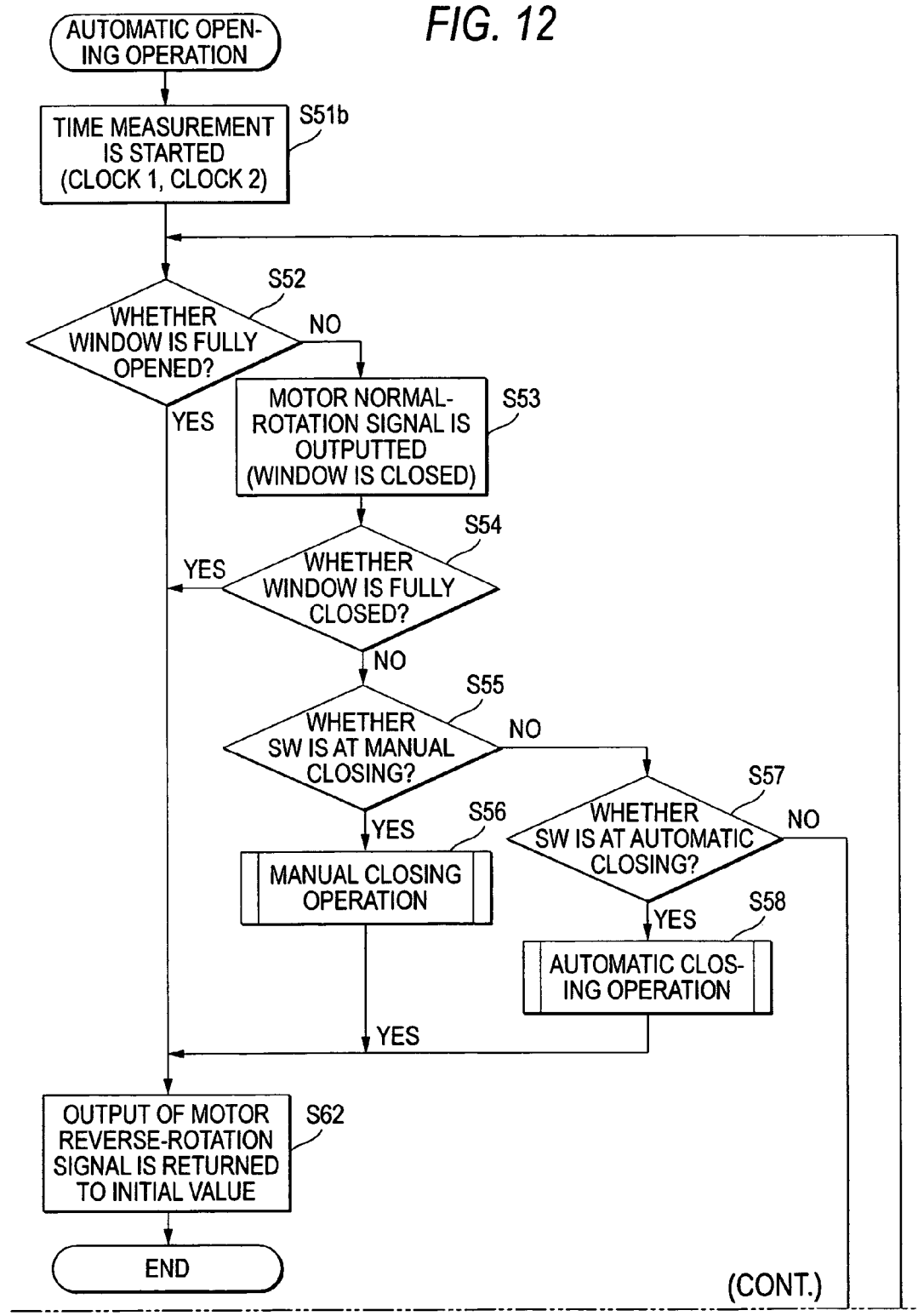
FIG. 12 is a flowchart showing operation of a fifth embodiment of the invention.
Figure 14:
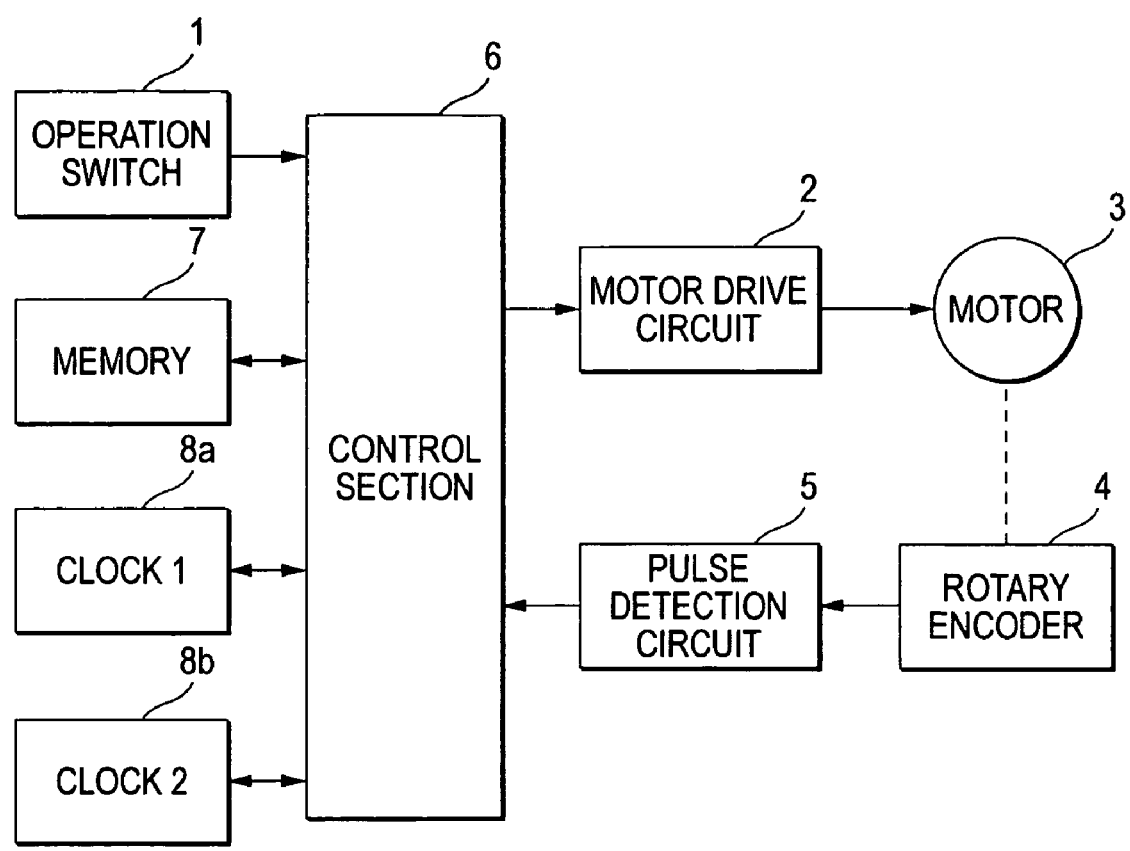
FIG. 14 is a block diagram showing an electrical configuration of a power window device of the fifth and sixth embodiments.

FIG. 12 is a flowchart showing a detailed procedure of the automatic opening operation in the step S8 of FIG. 5, which shows a procedure according to a fifth embodiment of the invention. The procedure is executed by the CPU configuring the control section 6. In FIG. 12, the same step as in FIG. 8 is marked with the same sign. In an opening-and-closing control device of the fifth embodiment, two clocks 8a (clock 1) and 8b (clock 2) are provided as shown in FIG. 14. Since other configuration is the same as in the case of FIG. 1, the same portions in FIG. 14 as those in the FIG. 1 are marked with the same signs.

When the operation knob 11 is operated to be situated in the position of the automatic opening AO to start the automatic opening operation, a clock 8a (hereinafter, mentioned as "clock 1") and a clock 8b (hereinafter, mentioned as "clock 2") start time measurement at that time point respectively (step S51b). Next, whether the window 100 is fully opened in the automatic opening operation is determined based on the output of the rotary encoder 4 (step S52). When the window 100 is fully opened (step S52: YES), the output of the motor reverse-rotation signal, which is described later, is returned to the initial value (step S62), and thus the operation is finished. When the window 100 is not fully opened (step S52: NO), the reverse rotation signal is outputted from the motor drive circuit 2 to reversely rotate the motor 3, so that the window 100 is opened (step S53). Subsequently, whether the window 100 is fully opened is determined (step S54), and when it is fully opened (step S54: YES), the output of the motor reverse-rotation signal is returned to the initial value (step S62), and thus the operation is finished. When the window 100 is not fully opened (step S54: NO), whether the operation switch 1 is situated in the position of the manual closing MC is determined (step S55).

When the operation switch 1 is situated in the position of the manual closing MC (step S55: YES), the operation is shifted to the manual closing operation as described before (FIG. 6) (step S56), and when it is not situated in the position of the manual closing MC (step S55: NO), whether it is situated in the position of the automatic closing AC is determined (step S57). When the operation switch 1 is situated in the position of the automatic closing AC (step S57: YES), the operation is shifted to the automatic closing operation as described before (FIG. 10 and the like) (step S58), and when the operation switch 1 is not situated in the position of the automatic closing AC (step S57: NO), whether the operation switch 1 is situated in the position of the automatic opening AO is determined (step S59). When the switch 1 is not situated in the position of the automatic opening AO (step S59: NO), whether it is situated in the manual opening MO is determined (step S64). When the switch 1 is also not situated in the position of the manual opening MO (step S64: NO), the switch is determined to be situated in the position of the neutral N, and the operation is returned to the step S52.

When the operation switch 1 is situated in the position of the automatic opening AO in the step S59 (step S59: YES), the clock 2 is reset and then the time measurement by the clock 2 is started (step S59a). Next, whether predetermined time has passed is determined by checking a measurement value of the clock 1 (step S60b). When the predetermined time has not passed (step S60b: NO), the operation is returned to the step S52. When the switch 1 is continuously held in the position of the automatic opening AO, and consequently the predetermined time has passed (step S60b: YES), the control section 6 provides the instruction to the motor drive circuit 2 to increase the output of the motor reverse-rotation signal by the certain level (step S61). Then, the clock 1 is reset and then the time measurement by the clock 1 is started (step S61b), and then the operation is returned to the step S52.

Moreover, when the operation switch 1 is not situated in the position of the automatic opening AO (step S59: NO) and situated in the position of the manual opening MO (step S64: YES), the clock 1 is reset and then the time measurement by the clock 1 is started (step S65). Next, whether predetermined time has passed is determined by checking a measurement value of the clock 2 (step S66). When the predetermined time has not passed (step S66: NO), the operation is returned to the step S52. When the switch 1 is continuously held in the position of the manual opening MO, and consequently the predetermined time has passed (step S66: YES), the control section 6 provides the instruction to the motor drive circuit 2 to decrease the output of the motor reverse-rotation signal by the certain level (step S67). Then, the clock 2 is reset and then the time measurement by the clock 2 is started (step S68), and then the operation is returned to the step S52.

In this way, in the fifth embodiment, first the operation knob 11 is operated to start the automatic opening operation, and then a time period for which the operation switch 1 is held in the position of the automatic opening AO is measured by the clock 1, and a time period for which the operation switch 1 is held in the position of the manual opening MO is measured by the clock 2. Then, when the operation knob 11 is held in the position of the automatic opening AO, the opening speed of the window 100 is increased according to holding time, and when the operation knob 11 is held in the position of the manual opening MO, the opening speed of the window 100 is decreased according to holding time. Therefore, the speed can be increased or decreased even while the automatic opening operation is performed, thereby the window 100 can be quickly or slowly opened. Moreover, when the hand is released from the operation knob 11 during increasing or decreasing the speed (step S59, S64: NO), the operation knob 11 is returned from the position of the automatic opening AO or the manual opening MO to the position of the neutral N, and even in this case, the window 100 continues the automatic opening operation at a speed immediately before releasing, or at the speed set in the step S61, S67 (step S53). Therefore, since the speed immediately before releasing is maintained by releasing the hand from the operation knob 11, the opening speed of the window 100 can be easily adjusted to the desired speed according to the timing at which the hand is released. According to the fifth embodiment, there is given an advantage that since the opening speed of the window 100 can be increased or decreased only by holding the operation knob 11 in the predetermined position, the complication that the operation knob 11 needs to be operated many times is eliminated.

While the opening speed of the window 100 is increased or decreased according to the time period for which the operation knob 11 is held in the position of the automatic opening AO or the manual opening MO after the automatic opening operation has been started in the fifth embodiment, the opening speed of the window 100 may be increased or decreased according to the number of operation that the operation knob 11 is temporarily returned to a position (for example, the neutral position) other than the position of the automatic opening AO, and then situated in the position of the automatic opening AO or the manual opening MO.

Figure 13:
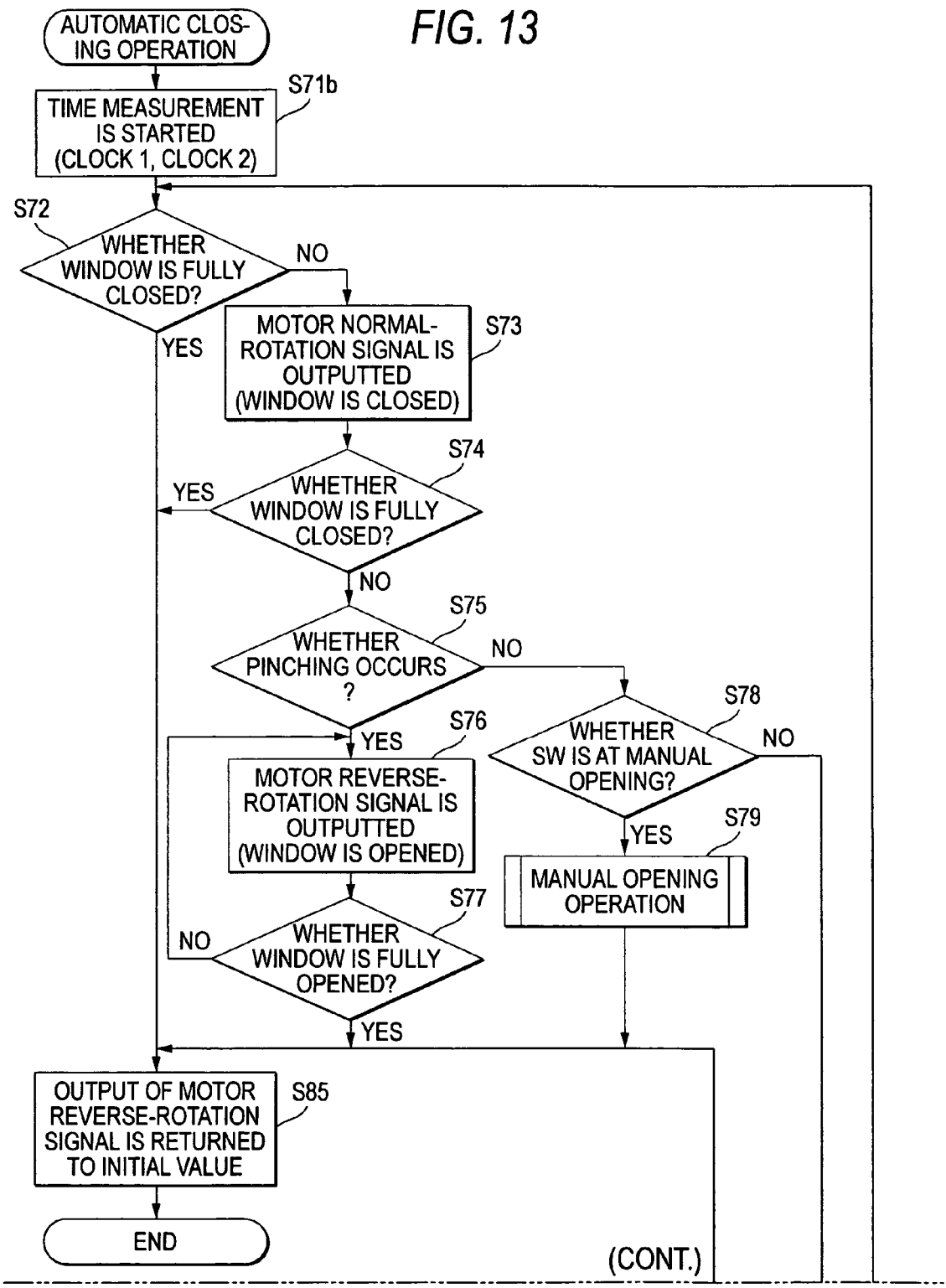
FIG. 13 is a flowchart showing operation of a sixth embodiment of the invention.

FIG. 13 is a flowchart showing a detailed procedure of the automatic closing operation in the step S4 of FIG. 5, which shows a procedure according to a sixth embodiment of the invention. The procedure is executed by the CPU configuring the control section 6. In FIG. 13, the same step as in FIG. 10 is marked with the same sign. Again in an opening-and-closing control device of the sixth embodiment, the two clocks 8a (clock 1) and 8b (clock 2) are provided as shown in FIG. 14.

When the operation knob 11 is operated to be situated in the position of the automatic closing AC to start the automatic closing operation, the clock 8a (hereinafter, mentioned as "clock 1") and the clock 8b (hereinafter, mentioned as "clock 2") start the time measurement at that time point respectively (step S71b). Next, whether the window 100 is fully closed in the automatic closing operation is determined based on the output of the rotary encoder 4 (step S72). When the window 100 is fully closed (step S72: YES), the output of the motor normal-rotation signal, which is described later, is returned to the initial value (step S85), and thus the operation is finished. When the window 100 is not fully closed (step S72: NO), the normal rotation signal is outputted from the motor drive circuit 2 to normally rotate the motor 3, so that the window 100 is closed (step S73). Subsequently, whether the window 100 is fully closed is determined (step S74), and when it is fully closed (step S74: YES), the output of the motor normal-rotation signal is returned to the initial value (step S85), and thus the operation is finished.

When the window 100 is not fully closed (step S74: NO), whether the pinching has occurred is determined (step S75).

When the pinching of the object Z as shown in FIG. 4 has occurred (step S75: YES), the reverse-rotation signal is outputted from the motor drive circuit 2 to reversely rotate the motor 3, so that the window 100 is opened (step S76). Then, whether the window 100 is fully opened is determined (step S77), and when it is fully opened (step S77: YES), the step S85 is executed and thus the operation is finished, and when it is not fully opened (step S77: NO), the operation is returned to the step S76 to continue the operation of opening the window 100.

When the pinching is not detected in the step S75 (step S75: NO), whether operation switch 1 is situated in the position of the manual opening MO is determined (step S78). When the operation switch 1 is situated in the position of the manual opening MO (step S78: YES), the operation is shifted to the manual opening operation as described before (FIG. 7) (step S79), and when it is not situated in the position of the manual opening MO (step S78: NO), whether it is situated in the position of the automatic opening AO is determined (step S80). When the operation switch 1 is situated in the position of the automatic opening AO (step S80: YES), the operation is shifted to the automatic opening operation as described before (FIG. 8, FIG. 9) (step S81), and when the operation switch 1 is not situated in the position of the automatic opening AO (step S80: NO), whether it is situated in the position of the automatic closing AC is determined (step S82). When the operation switch 1 is also not situated in the position of the automatic closing AC (step S82: NO), whether it is situated in the position of the manual closing MC is determined (step S87). When the switch 1 is also not situated in the position of the manual closing MC (step S87: NO), the switch is determined to be situated in the position of the neutral N, and the operation is returned to the step S72.

When the switch 1 is situated in the position of the automatic closing AC in the step S82 (step S82: YES), the clock 2 is reset and then the time measurement by the clock 2 is started (step S82a). Next, whether the predetermined time has passed is determined by checking the measurement value of the clock 1 (step S83b). When the predetermined time has not passed (step S83b: NO), the operation is returned to the step S72. When the switch 1 is continuously held in the position of the automatic closing AC, and consequently the predetermined time has passed (step S83b: YES), the control section 6 provides the instruction to the motor drive circuit 2 to increase the output of the motor normal-rotation signal by the certain level (step S84). Then, the clock 1 is reset and then the time measurement by the clock 1 is started (step S84b), and then the operation is returned to the step S72.

Moreover, when the operation switch 1 is not situated in the position of the automatic closing AC (step S82: NO) and situated in the position of the manual closing MC (step S87: YES), the clock 1 is reset and then the time measurement by the clock 1 is started (step S88). Next, whether the predetermined time has passed is determined by checking the measurement value of the clock 2 (step S89). When the predetermined time has not passed (step S89: NO), the operation is returned to the step S72. When the switch 1 is continuously held in the position of the manual closing MC, and consequently the predetermined time has passed (step S89: YES), the control section 6 provides the instruction to the motor drive circuit 2 to decrease the output of the motor normal-rotation signal by the certain level (step S90). Then, the clock 2 is reset and then the time measurement by the clock 2 is started (step S91), and then the operation is returned to the step S72.

In this way, in the sixth embodiment, first the operation knob 11 is operated to start the automatic closing operation, and then the time period for which the operation switch 1 is held in the position of the automatic closing AC is measured by the clock 1, and the time period for which the operation switch 1 is held in the position of the manual closing MC is measured by the clock 2. Then, when the operation knob 11 is held in the position of the automatic closing AC, the closing speed of the window 100 is increased according to holding time, and when the operation knob 11 is held in the position of the manual closing MC, the closing speed of the window 100 is decreased according to holding time. Therefore, the speed can be increased or decreased even while the automatic closing operation is performed, thereby the window 100 can be quickly or slowly closed. Moreover, when the hand is released from the operation knob 11 during increasing or decreasing the speed (step S82, S87: NO), the operation knob 11 is returned from the position of the automatic closing AC or the manual closing MC to the position of the neutral N, and even in this case, the window 100 continues the automatic closing operation at a speed immediately before releasing, or at the speed set in the step S84, S90 (step S73). Therefore, since the speed immediately before releasing is maintained by releasing the hand from the operation knob 11, the closing speed of the window 100 can be easily adjusted to the desired speed according to the timing at which the hand is released. According to the sixth embodiment, there is given an advantage that since the closing speed of the window 100 can be increased or decreased only by holding the operation knob 11 in the predetermined position, the complication that the operation knob 11 needs to be operated many times is eliminated.

While the closing speed of the window 100 is increased or decreased according to the time period for which the operation knob 11 is held in the position of the automatic closing AC or the manual closing MC after the automatic closing operation has been started in the sixth embodiment, the closing speed of the window 100 may be increased or decreased according to the number of operation that the operation knob 11 is temporarily returned to a position (for example, the neutral position) other than the position of the automatic closing AC, and then situated in the position of the automatic closing AC or the manual closing MC.

While exemplary embodiments of the invention applied to the power window device of the vehicle were given above, it will be understood by those of ordinary skill in the art that one or more embodiments of the invention can be also applied to a device for controlling an opening-and-closing body of a slide door, sunroof, or the like.

What is claimed is:

1. An opening-and-closing control device comprising:
    an operation knob which performs opening-and-closing control of an opening-and-closing body according to an instruction from an operation switch that is switchable to each of positions of "automatic closing", "manual closing", "neutral", "manual opening" and "automatic opening",
    manual opening operation control means by which the operation knob is operated to be situated in the position of the "manual opening", thereby the opening-and-closing body is allowed to perform opening operation only while the operation knob is held in the position of the "manual opening",
    manual closing operation control means by which the operation knob is operated to be situated in the position of the "manual closing" position, thereby the opening-and-closing body is allowed to perform closing operation only while the operation knob is held in the position of the "manual closing",
    automatic opening operation control means by which the operation knob is operated to be situated in the position of the "automatic opening", thereby the opening-and-closing body is allowed to continuously perform the opening operation, and
    automatic closing operation control means by which the operation knob is operated to be situated in the position of the "automatic closing", thereby the opening-and-closing body is allowed to continuously perform the closing operation, wherein
    after the automatic opening operation is started, opening speed of the opening-and-closing body is increased according to a time period for which the operation knob is held in the position of the "automatic opening" or the "manual opening".

2. The opening-and-closing control device according to claim 1, wherein
    when the operation knob situated in the position of the "automatic opening" or the "manual opening" is separated from the position, the opening-and-closing body is opened at a speed immediately before separation.

3. An opening-and-closing control device comprising:
    an operation knob which performs opening-and-closing control of an opening-and-closing body according to an instruction from an operation switch that is switchable to each of-positions of "automatic closing", "manual closing", "neutral", "manual opening" and "automatic opening",
    manual opening operation control means by which the operation knob is operated to be situated in the position of the "manual opening", thereby the opening-and-closing body is allowed to perform opening operation only while the operation knob is held in the position of the "manual opening",
    manual closing operation control means by which the operation knob is operated to be situated in the position of the "manual closing", thereby the opening-and-closing body is allowed to perform closing operation only while the operation knob is held in the position of the "manual closing",
    automatic opening operation control means by which the operation knob is operated to be situated in the position of the "automatic opening", thereby the opening-and-closing body is allowed to continuously perform the opening operation, and
    automatic closing operation control means by which the operation knob is operated to be situated in the position of the "automatic closing", thereby the opening-and-closing body is allowed to continuously perform the closing operation, wherein
    after the automatic opening operation is started, opening speed of the opening-and-closing body is increased according to the number of operation that the operation knob is temporarily returned to a position other than the position of the "automatic opening", and then situated in the position of the "automatic opening" or the "manual opening".

4. The opening-and-closing control device according to claim 3, wherein
    when the operation knob situated in the position of the automatic opening or the manual opening is separated from the position, the opening-and-closing body is opened at a speed immediately before separation.

5. An opening-and-closing control device comprising:
an operation knob which performs opening-and-closing control of an opening-and-closing body according to an instruction from an operation switch that is switchable to each of positions of "automatic closing", "manual closing", "neutral", "manual opening," and "automatic opening",
manual opening operation control means by which the operation knob is operated to be situated in the position of the "manual opening", thereby the opening-and-closing body is allowed to perform opening operation only while the operation knob is held in the position of the "manual opening",
manual closing operation control means by which the operation knob is operated to be situated in the position of the "manual closing", thereby the opening-and-closing body is allowed to perform closing operation only while the operation knob is held in the position of the "manual closing",
automatic opening operation control means by which the operation knob is operated to be situated in the position of the "automatic opening", thereby the opening-and-closing body is allowed to continuously perform the opening operation, and
automatic closing operation control means by which the operation knob is operated to be situated in the position of the "automatic closing", thereby the opening-and-closing body is allowed to continuously perform the closing operation, wherein
after the automatic closing operation is started, closing speed of the opening-and-closing body is increased according to a time period for which the operation knob is held in the position of the "automatic closing" or the "manual closing".

6. The opening-and-closing control device according to claim 5, wherein
when the operation knob situated in the position of the "automatic closing" or the "manual closing" is separated from the position, the opening-and-closing body is closed at a speed immediately before separation.

7. An opening-and-closing control device comprising:
an operation knob which performs opening-and-closing control of an opening-and-closing body according to an instruction from an operation switch that is switchable to each of positions of "automatic closing", "manual closing", "neutral", "manual opening," and "automatic opening",
manual opening operation control means by which the operation knob is operated to be situated in the position of the "manual opening", thereby the opening-and-closing body is allowed to perform opening operation only while the operation knob is held in the position of the "manual opening",
manual closing operation control means by which the operation knob is operated to be situated in the position of the "manual closing", thereby the opening-and-closing body is allowed to perform closing operation only while the operation knob is held in the position of the "manual closing",
automatic opening operation control means by which the operation knob is operated to be situated in the position of the "automatic opening", thereby the opening-and-closing body is allowed to continuously perform the opening operation, and
automatic closing operation control means by which the operation knob is operated to be situated in the position of the "automatic closing", thereby the opening-and-closing body is allowed to continuously perform the closing operation, wherein
after the automatic closing operation is started, closing speed of the opening-and-closing body is increased according to the number of operation that the operation knob is temporarily returned to a position other than the position of the "automatic closing", and then situated in the position of the "automatic closing" or the "manual closing".

8. The opening-and-closing control device according to claim 7, wherein
when the operation knob situated in the position of the automatic closing or the manual closing is separated from the position, the opening-and-closing body is closed at a speed immediately before separation.

9. An opening-and-closing control device comprising:
an operation knob which performs opening-and-closing control of an opening-and-closing body according to an instruction from an operation switch that is switchable to each of positions of "automatic closing", "manual closing", "neutral", "manual opening" and "automatic opening",
manual opening operation control means by which the operation knob is operated to be situated in the position of the "manual opening", thereby the opening-and-closing body is allowed to perform opening operation only while the operation knob is held in the position of the "manual opening",
manual closing operation control means by which the operation knob is operated to be situated in the position of the "manual closing", thereby the opening-and-closing body is allowed to perform closing operation only while the operation knob is held in the position of the "manual closing",
automatic opening operation control means by which the operation knob is operated to be situated in the position of the "automatic opening", thereby the opening-and-closing body is allowed to continuously perform the opening operation, and
automatic closing operation control means by which the operation knob is operated to be situated in the position of the "automatic closing", thereby the opening-and-closing body is allowed to continuously perform the closing operation; characterized in that,
after the automatic opening operation is started, opening speed of the opening-and-closing body is increased according to a time period for which the operation knob is held in the position of the "automatic opening", and the opening speed of the opening-and-closing body is decreased according to a time period for which the operation knob is held in the position of the "manual opening".

10. The opening-and-closing control device according to claim 9, wherein
when the operation knob situated in the position of the automatic opening or the manual opening is separated from the position, the opening-and-closing body is opened at a speed immediately before separation.

11. An opening-and-closing control device comprising:
an operation knob which performs opening-and-closing control of an opening-and-closing body according to an instruction from an operation switch that is switchable to each of positions of "automatic closing", "manual closing", "neutral", "manual opening" and "automatic opening", manual opening operation control means by which the operation knob is operated to be situated in the position of the "manual opening", thereby the opening-and-closing body is allowed to perform opening operation only while the operation knob is held in the position of the "manual opening", manual closing operation control means by which the operation knob is operated to be situated in the position of the "manual closing", thereby the opening-and-closing body is allowed to perform closing operation only while the operation knob is held in the position of the "manual closing", automatic opening operation control means by which the operation knob is operated to be situated in the position of the "automatic opening", thereby the opening-and-closing body is allowed to continuously perform the opening operation, and automatic closing operation control means by which the operation knob is operated to be situated in the position of the "automatic closing", thereby the opening-and-closing body is allowed to continuously perform the closing operation, wherein after the automatic closing operation is started, closing speed of the opening-and-closing body is increased according to a time period for which the operation knob is held in the position of the "automatic closing", and the closing speed of the opening-and-closing body is decreased according to a time period for which the operation knob is held in the position of the "manual closing".

12. The opening-and-closing control device according to claim 11, wherein when the operation knob situated in the position of the automatic closing or the manual closing is separated from the position, the opening-and-closing body is closed at a speed immediately before separation.

* * * * *